United States Patent [19]
Bederman et al.

[11] 3,839,800
[45] Oct. 8, 1974

[54] METHOD AND APPARATUS FOR PRECISELY CONTOURING A WORK-PIECE IMPRECISELY POSITIONED ON A FIXTURE

[75] Inventors: Seymour Bederman, Yorktown; Larry G. Lankford, Mahopac, both of N.Y.

[73] Assignee: International Business Machines Corporation, Armonk, N.Y.

[22] Filed: Apr. 20, 1971

[21] Appl. No.: 135,777

Related U.S. Application Data

[62] Division of Ser. No. 756,091, Aug. 29, 1968, Pat. No. 3,633,011.

[52] U.S. Cl................................................ 33/174 L
[51] Int. Cl. .............................................. G01b 5/24
[58] Field of Search .. 235/151.11; 33/174 L, 174 P, 33/174 E

[56] References Cited
UNITED STATES PATENTS

| | | | |
|---|---|---|---|
| 2,383,316 | 8/1945 | Jennings............................ | 33/174 E |
| 2,697,879 | 12/1954 | Tandler............................. | 33/174 L |
| 2,765,510 | 7/1956 | Tandler............................. | 33/174 P |
| 2,835,042 | 5/1958 | Tandler............................. | 33/174 L |
| 3,481,042 | 12/1969 | Lemelson.......................... | 33/174 L |

*Primary Examiner*—William D. Martin, Jr.
*Attorney, Agent, or Firm*—Graham S. Jones, II

[57] ABSTRACT

Method and apparatus for manufacturing precisely dimensioned metal parts on a program-controlled machine tool having a workpiece-supporting fixture, without the necessity of precisely locating the workpiece on the fixture.

The workpiece is first placed on the fixture in an approximate position within predetermined limits of a standard position. The actual position (i.e., location and orientation) of the workpiece on the fixture is then measured by means of a programmed measuring apparatus while the fixture is accurately located with respect to that apparatus. The machine tool is controlled by a standard program, based on a standard position of the workpiece on its fixture and an accurate location of the fixture on the machine tool. The data defining the actual position of the workpiece on the fixture are utilized to modify the program of the machine tool, so as to compensate for the difference between the standard position of the workpiece and its actual position.

The measurement of the workpiece position is performed at a measuring station, and the fixture with the workpiece mounted thereon is then conveyed to a fabrication station, which is shown as including a numerically-controlled five-axis machine tool. The position defining data determined at the measuring station is associated with identifying data of the particular fixture and is stored in a memory. When that fixture arrives at the fabrication station, it is accurately located with respect to the machine tool, and is identified. The identifying data is used to retrieve from the memory the proper set of position defining data, which is used to modify the machine tool program to produce the desired precisely dimensioned product.

6 Claims, 27 Drawing Figures

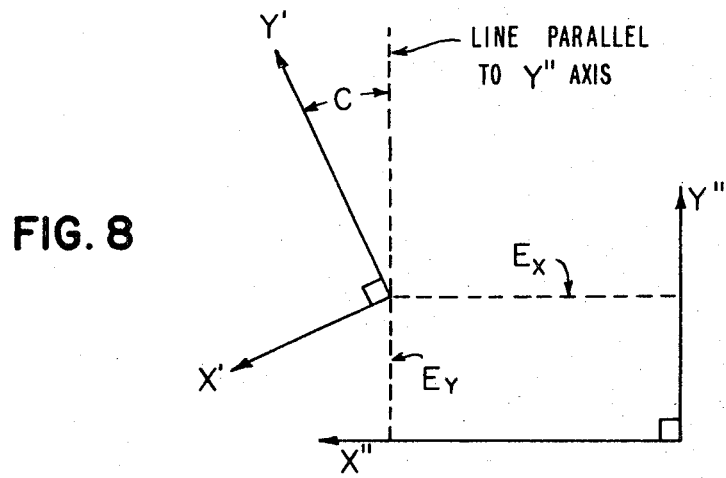
FIG. 8
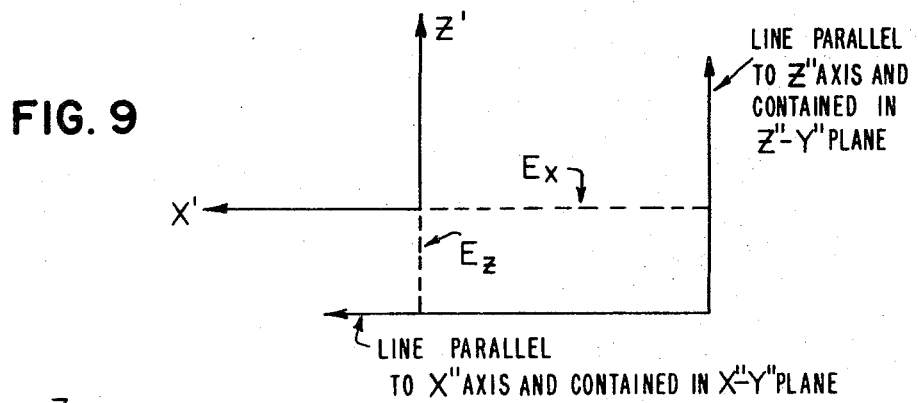
FIG. 9
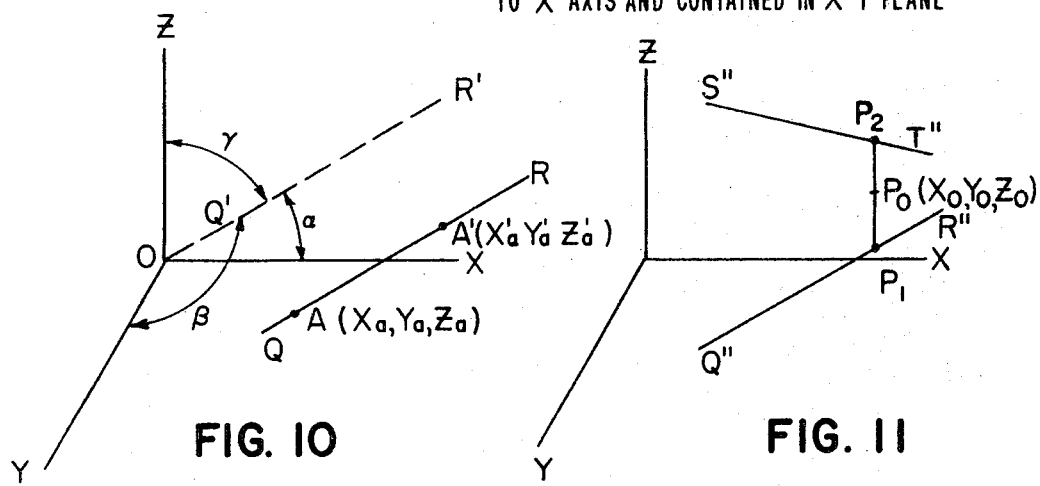
FIG. 10
FIG. 11

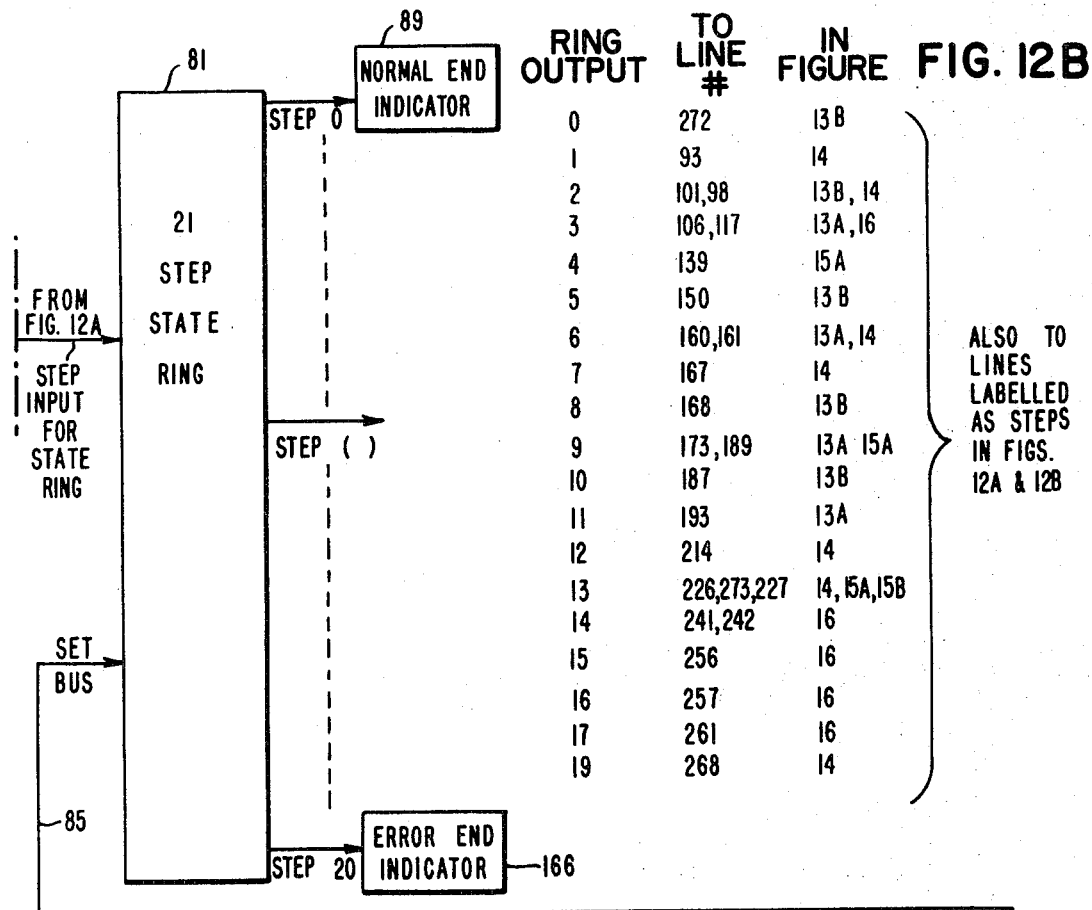
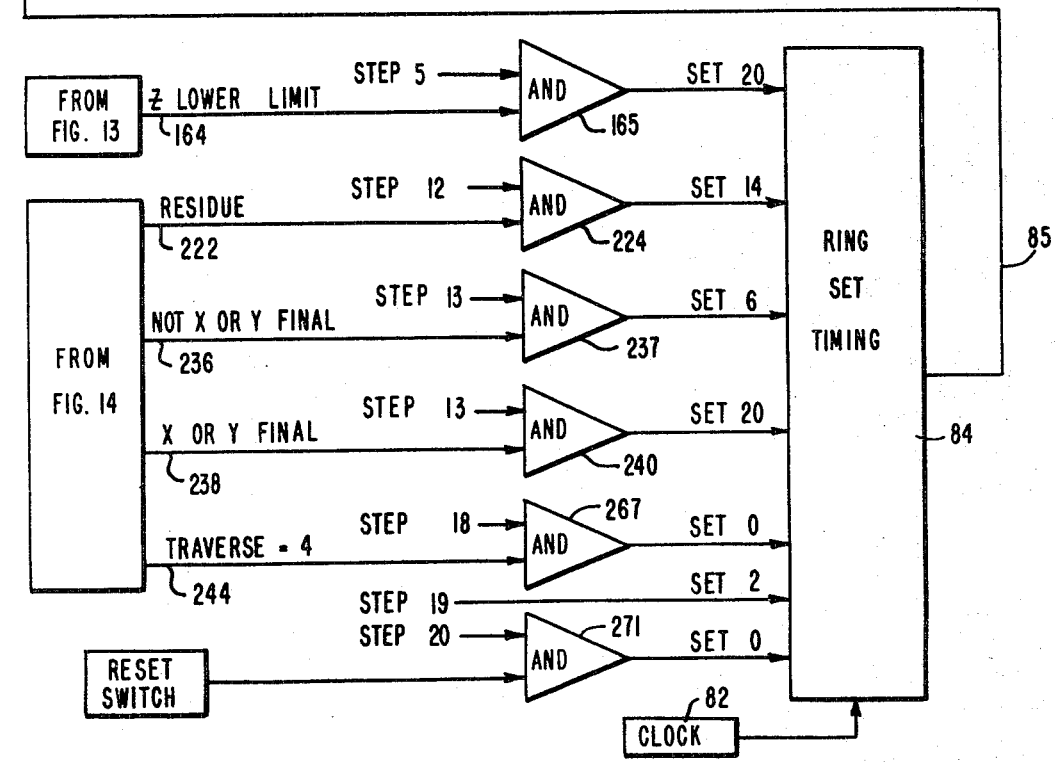
FIG. 12B

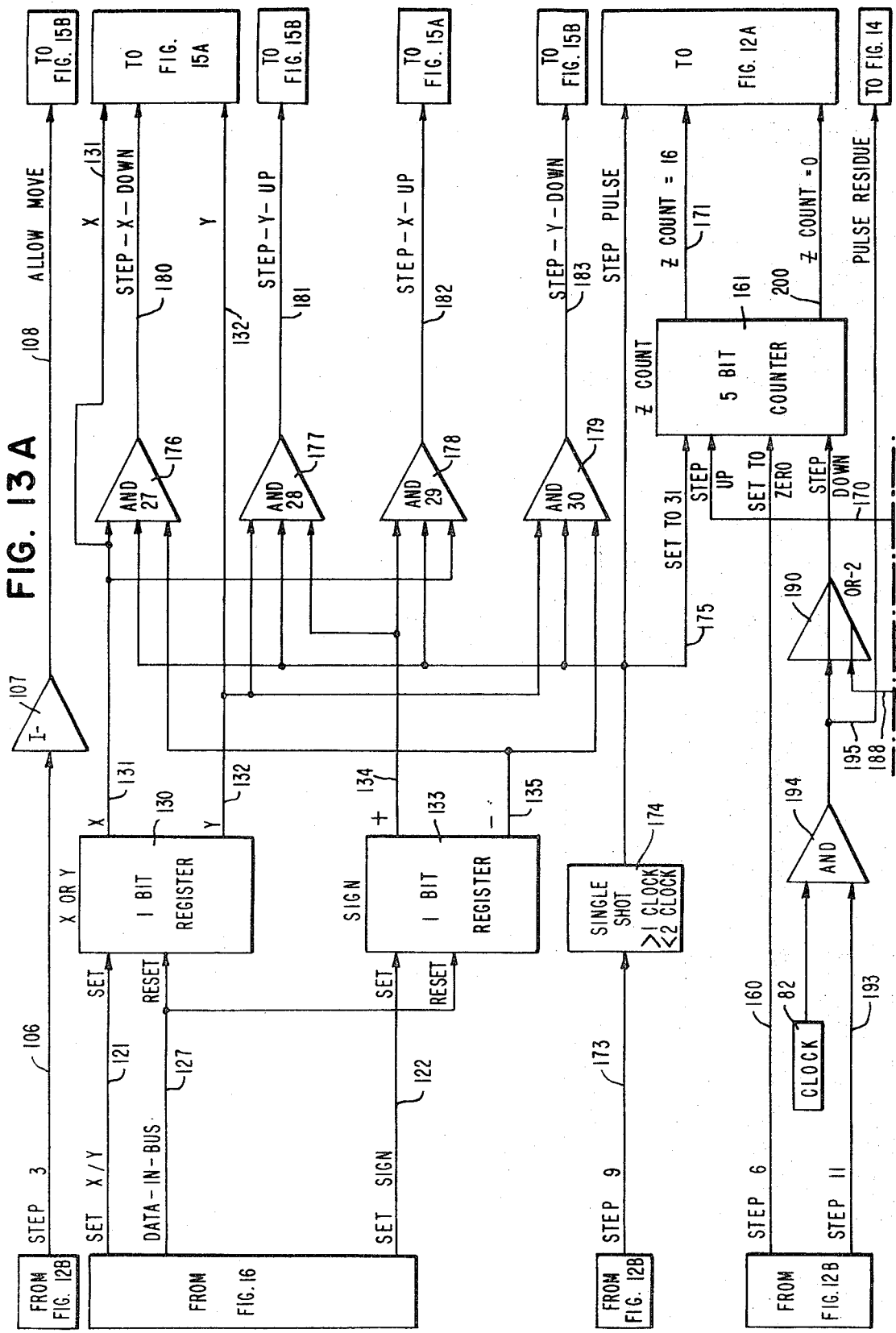

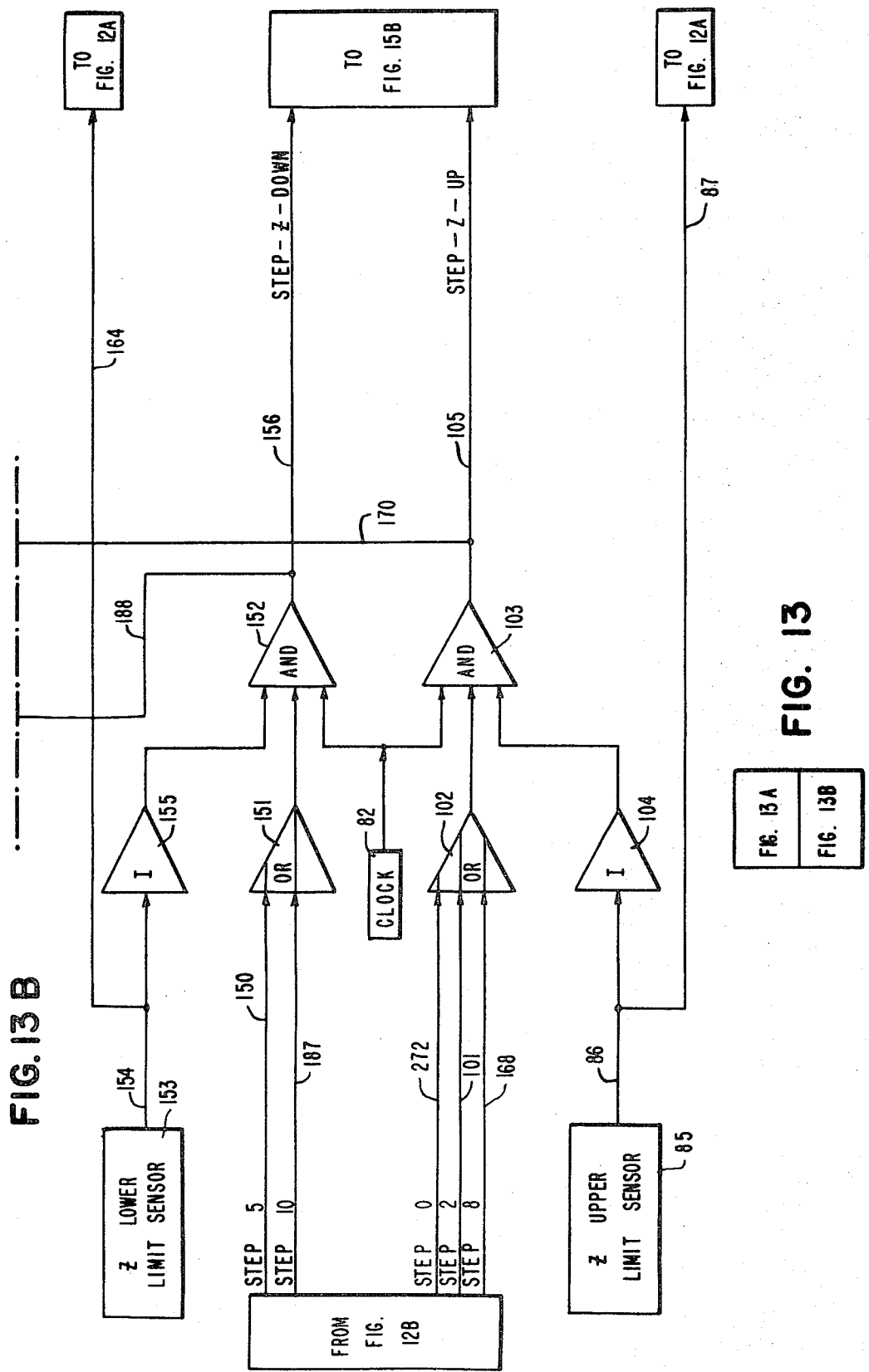

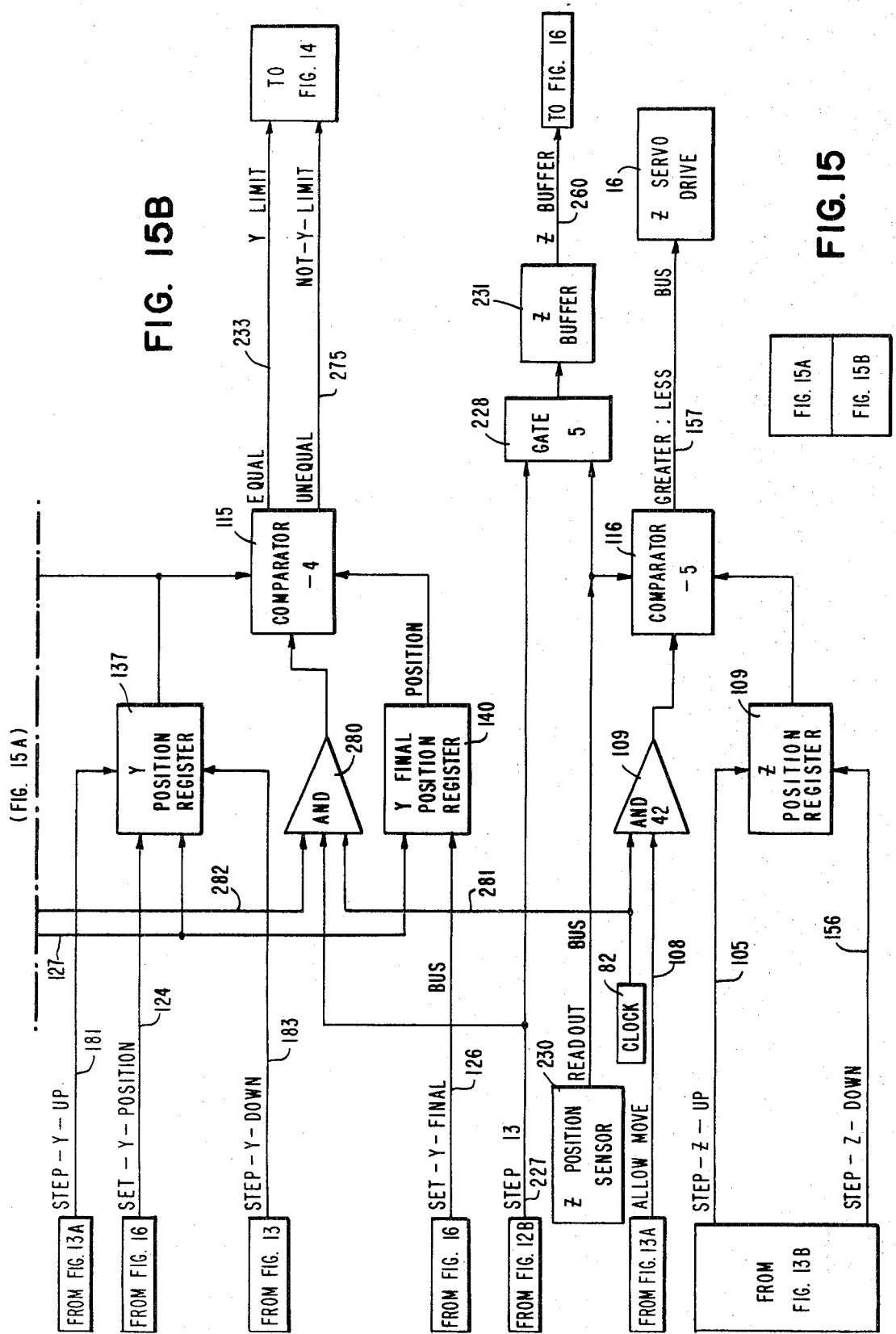

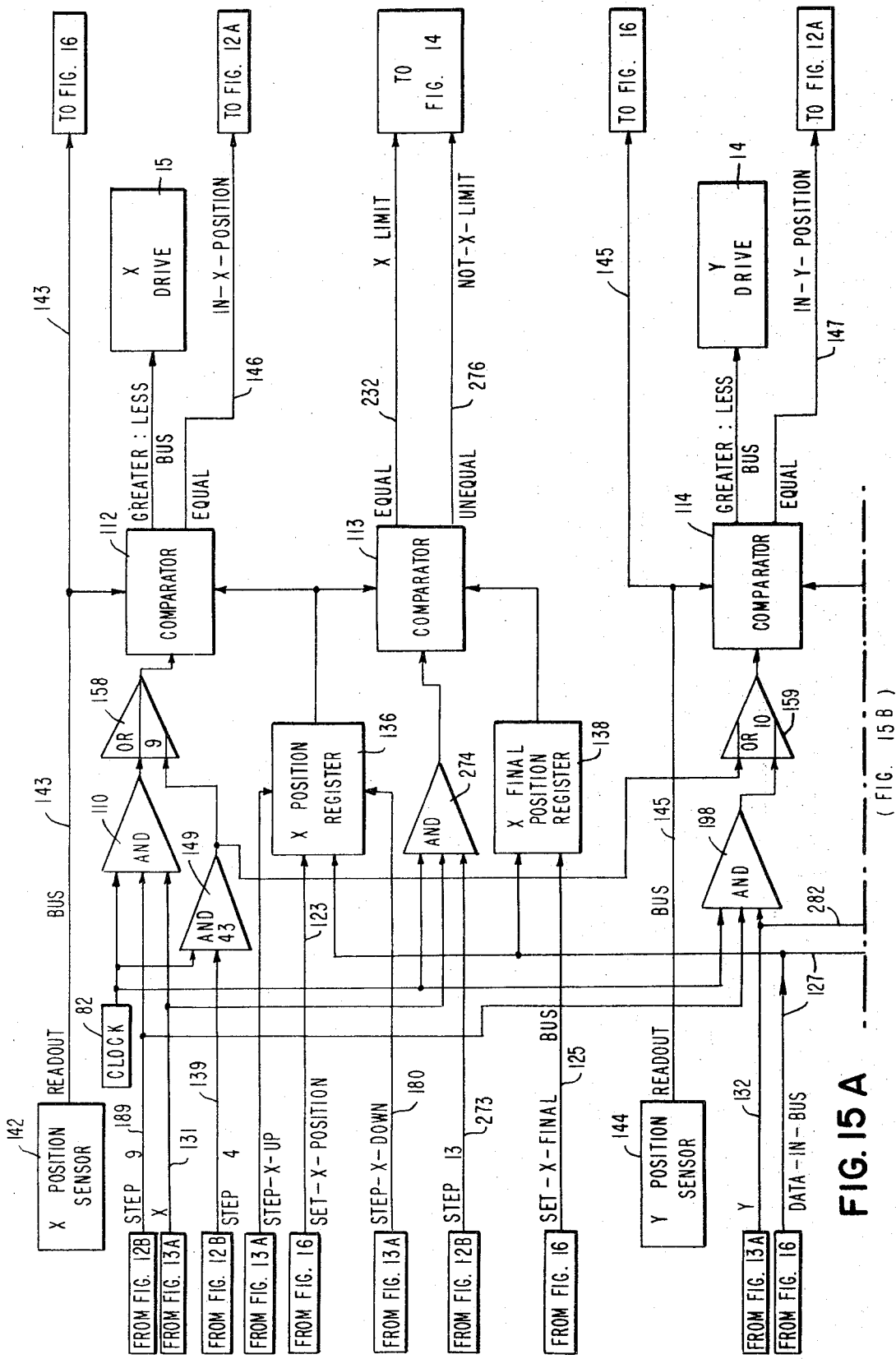

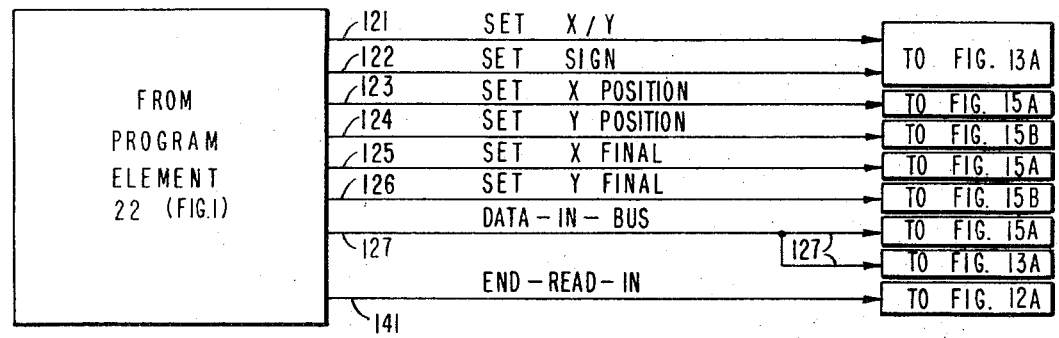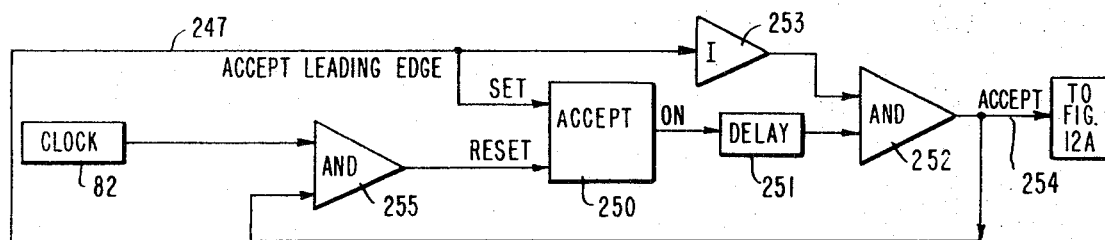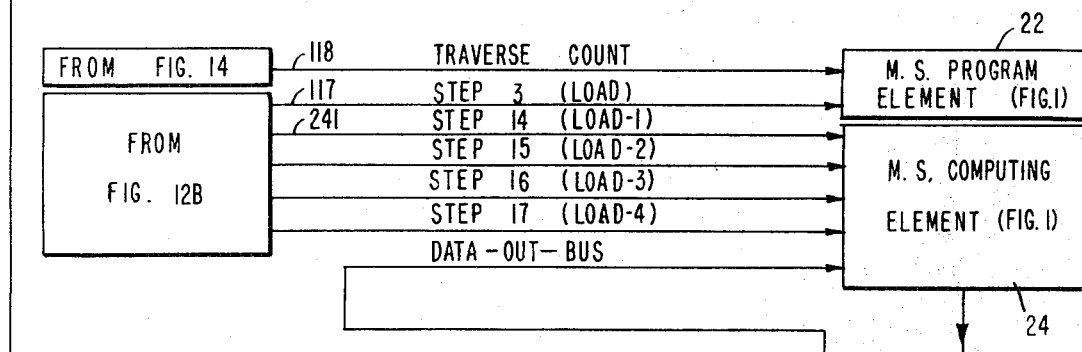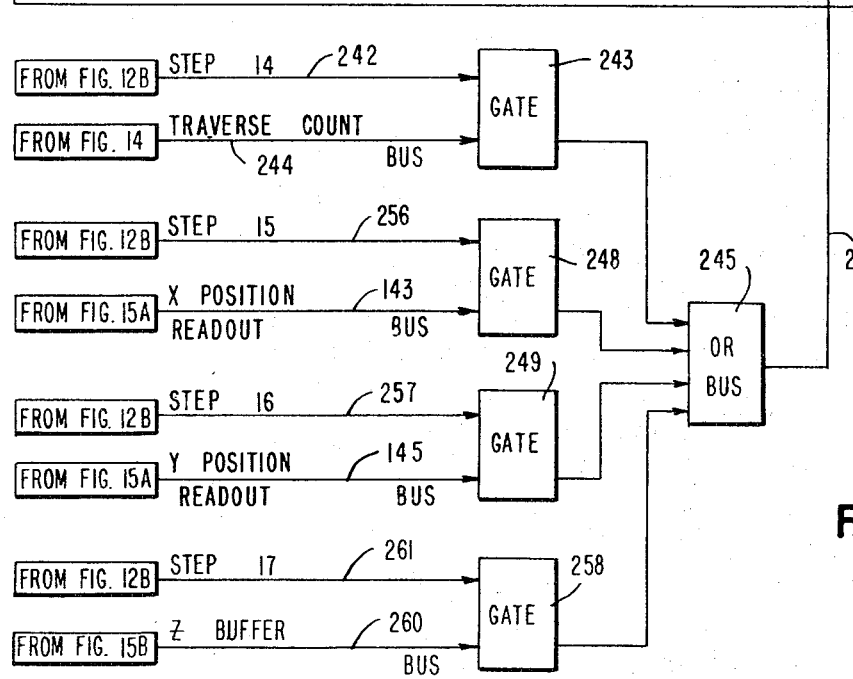
FIG. 16

STEP SEQUENCE DIAGRAM

METHOD AND APPARATUS FOR PRECISELY CONTOURING A WORK-PIECE IMPRECISELY POSITIONED ON A FIXTURE

This application is a division of co-pending application Ser. No. 756,091, filed Aug. 29, 1968 now U.S. Pat. No. 3,633,011.

BACKGROUND OF THE INVENTION

Program-controlled machine tools establish the relative positions of the workpiece and the metal working tool in response to a stored program so as to produce a precise contour on the workpiece. The stored program controls the sequence of motions of the workpiece and of the cutting head or other metal working device. In all such program-controlled machine tools of the prior art, it has been necessary to position the workpiece precisely on a suitable support or fixture, which is in turn precisely positioned with respect to the cutting head.

Program-controlled machine tools, especially those of the type known as numerically-controlled machine tools, are capable of producing precise contours within tolerance limits of 0.001 inch or smaller. In order to maintain the precision of the workpiece contour within such limits, the workpiece must be positioned on the fixture within limits of the same order of magnitude. The precise positioning of a workpiece by either manually or automatically controlled means within such fine limits is time consuming and presents a serious limitation on the output of such a program-controlled machine tool.

BRIEF SUMMARY OF THE INVENTION

The methods and apparatus of the present invention allow an operator to place a workpiece on a fixture at a position anywhere within relatively wide tolerance limits (e.g., ⅛ or ¼ inch) of a standard position. Such imprecise positioning can be easily and quickly accomplished manually or by power operated means. According to the present invention, the program of the machine tool is modified in accordance with the difference between the actual position of the workpiece on its fixture and the standard position, so that the machine tool produces precise contours on the workpiece within the same tolerance limits as if the workpiece were in its standard position.

A workpiece to be precisely machined according to the invention, must first have placed on it a plurality of precisely located datum marks, with respect to which the desired locations of the machine operations are known. In the embodiment described, these datum marks take the form of datum contours which may be formed on the workpiece by conventional, manually controlled machines. These datum contours may be either: (a) two non-parallel straight edges; or (b) three non-parallel planes, whose intersections need not be on the workpiece surface.

The workpiece, with the datum contours formed thereon, is placed on a fixture adapted to support the workpiece while it is being fabricated by one or more machine tools. The machine tool is controlled by a stored program, which, as stored, is effective to produce a finished product of the desired contour only if the workpiece has its datum contours in a predetermined standard position with respect to the fixture, and the fixture is accurately located in a predetermined position in the machine tool.

The workpiece is placed on the fixture in an approximate position, i.e., within predetermined limits of the standard position. These limits can typically permit rotational displacements of the workpiece, with respect to a center of rotation which is specified with respect to the fixture, such that angles of pitch, yaw, and tilt of up to 30° can be tolerated, while linear displacements, in each of three orthogonal directions, of up to one-quarter inch can also be tolerated. (The maximum size of the tolerance limits is a function of the distances between the workpiece's surface discontinuities - i.e., straight edges or surfaces — which are visible when looking down on a standard-oriented workpiece which is mounted on the fixture.) Thus, the placement of this workpiece in the fixture is easier to achieve than if positioning within, say, a ten-thousandth inch limit were required.

The fixture is then placed in an accurately located position with respect to a table in a measuring apparatus. The table is movable in orthogonal directions with respect to the base of the measuring apparatus. The measuring apparatus controls the movement of the table and also of a probe which is movable vertically to engage and disengage the surface of the workpiece. The table is controlled to produce a relative movement between the workpiece and the probe so that a downward projection of the probe position describes a predetermined path across the workpiece surface. At spaced points along that path, the probe is controlled to move downwardly and engage the working surface. Data defining the points where the probe encounters the datum contours are recorded. After a sufficient number of such points are located, that data determines precisely the position of the workpiece on the fixture. This position defining data is used to compute correction data for modifying the machine tool program so that it will accurately command the desired machining operation on the workpiece in its actual position.

In the apparatus illustrated, the fixture carries identifying indicia which may be read visually or automatically. The probing operation is carried out at a measurement station and the fixture then travels on a conveyor to a fabrication station. Before a workpiece leaves the measurement station, its position defining data is stored in a memory in association with data identifying the fixture carrying that workpiece. When the fixture arrives at the fabrication station, the identifying indicia on the fixture is again observed, and is used to retrieve from memory the position defining data, which is utilized to modify the tool program to produce the desired product.

Although only one fabrication station is illustrated, a more typical arrangement would include a plurality of such stations, connected by conveyors, and all having access to a common memory in which the position-correcting data for all workpiece-carrying fixtures are stored.

Alternatively, only one operating station may be employed, at which the measurement operation and one or more fabrication operations may be carried out.

BRIEF DESCRIPTION OF THE DRAWINGS

FIG. 8 is a graphical illustration showing the relationship between the two machine coordinates X'', and Y'' and two compensating coordinates X', Y';

FIG. 9 is a graphical illustration, which cooperates with FIG. 8, and illustrates the relationship between compensating coordinates X', Z' and the machine tool coordinates X'', Z'';

FIG. 10 is a graphical illustration of the angles whose cosines are used as direction cosines in fixing the orientation of the datum contours;

FIG. 11 is a graphical illustration of the midpoint of the mutual perpendicular to two non-intersecting lines, which midpoint is used as a reference point for locating certain workpieces;

FIG. 12 is a diagrammatic illustration showing how FIGS. 12A and 12B are related;

FIGS. 12A and 12B illustrate a part of the logic circuits in the measuring station control element shown as a single block in FIG. 1;

FIG. 13 is a diagrammatic illustration showing how FIGS. 13A and 13B are related;

FIGS. 13A and 13B illustrate additional logic circuits forming part of the measuring station control element;

FIG. 15 illustrates diagrammatically how FIGS. 15A and 15B are related;

FIGS. 15A and 15B show in block diagram form additional logic circuits of the measuring station control element;

FIG. 16 shows still further circuits of the measuring station control element, in block diagram form;

FIGS. 1–2

FIG. 1 illustrates in block diagram form the principal elements of an apparatus embodying the invention. The apparatus includes a measurement station generally indicated at 1, a fabrication station generally indicated at 2, and a memory generally indicated at 3. The memory 3 may be at either of the stations 1 and 2, or it may be remoted from both of them. FIG. 2 is a perspective view of the machine tool which includes the principal elements at the fabrication station 2.

Figure 1:
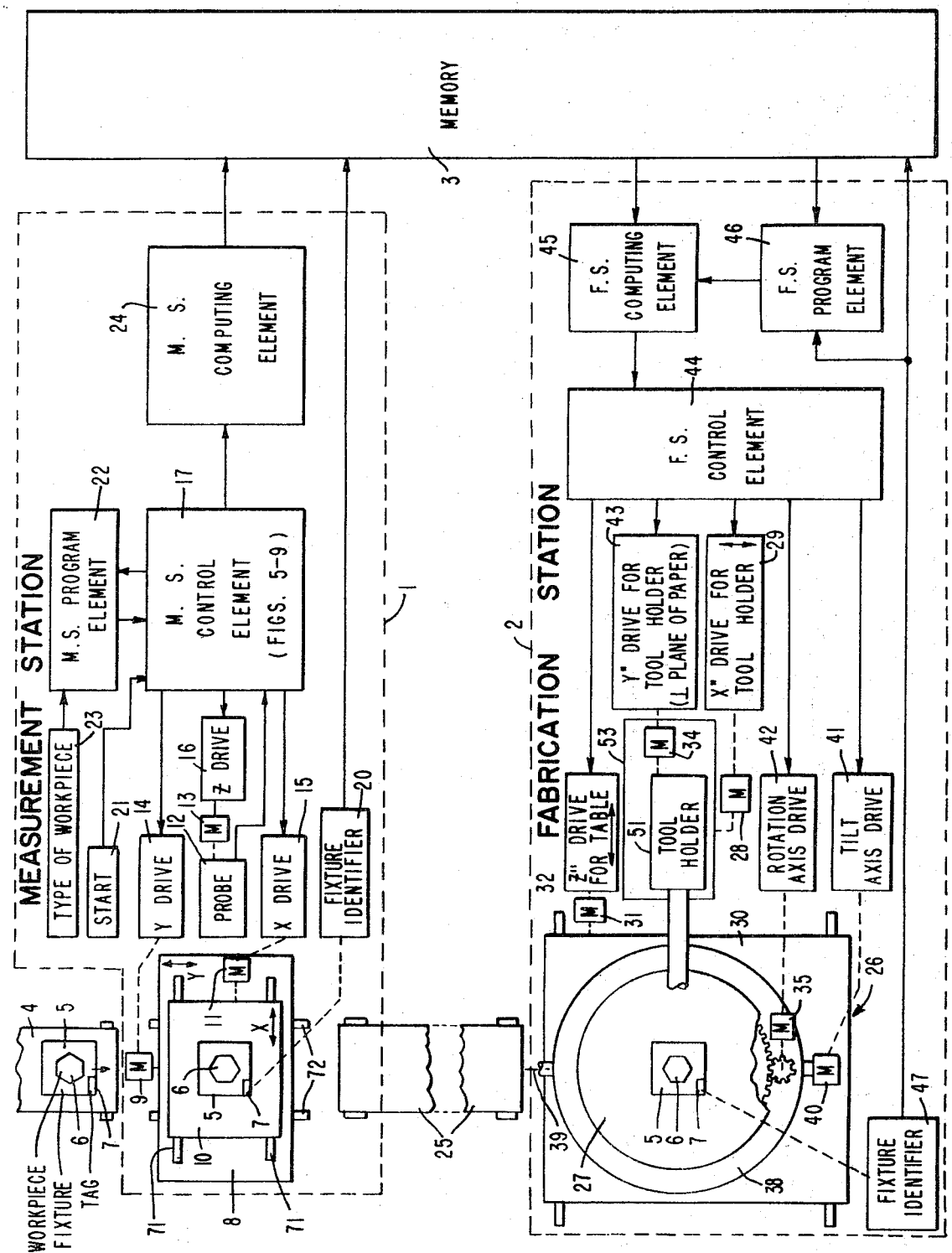
FIG. 1 is a block diagram schematically illustrating apparatus embodying the invention.

A conveyor 4 delivers to the measurement station 1, a series of fixtures 5, on each of which is mounted a workpiece 6 to be fabricated. Each fixture 5 carries a tag 7 on which are formed identifying data which may be either machine readable or visually readable. The tag 7 on each filter 5 identifies that fixture individually, apart from all the other workpiece-supporting fixtures.

Figure 3:
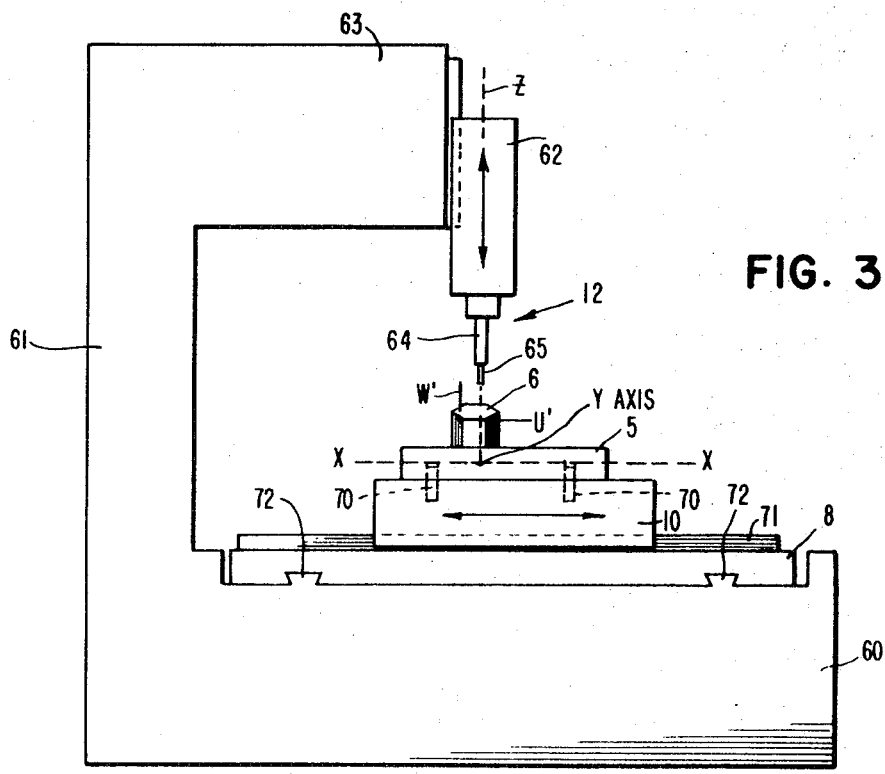
FIG. 3 is a somehwat diagrammatic elevational view of the measurement station illustrated in FIG. 1.
Figure 4:
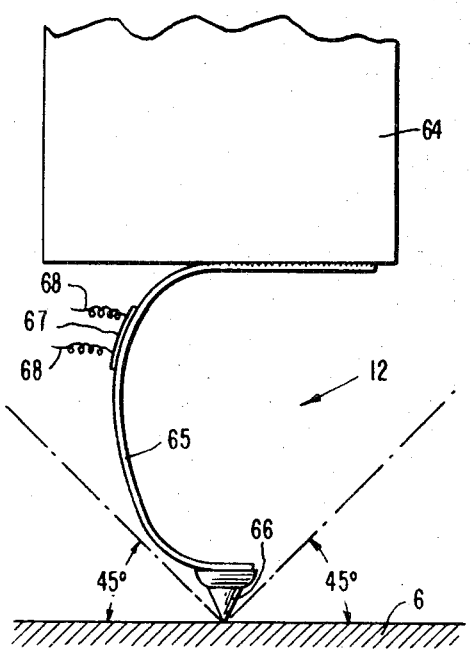
FIG. 4 is an elevational view on a greatly enlarged scale, showing one form of position probe which may be used in the measurement station of FIG. 3.

Either an operator or a conventional transfer mechanism, not shown in the drawing, moves each fixture 5 from conveyor 4 to a table 10 in the measurement station 1. At the table 10, shot pins 70 (FIG. 3) or other suitable locating mechanisms engage holes or other accurately located surfaces on the fixture 5, to establish the fixture in an accurate position on the table 10. Table 10 is movable in the X direction along suitable ways 71 by a motor 11. The ways 71 supporting table 10 are mounted on another table 8 driven by a motor 9 along stationary ways 72 in the Y direction indicated in the drawing. A probe 12, illustrated in more detail in connection with FIGS. 3 and 4, is movable in the Z direction (in FIG. 1, the Z direction is perpendicular to the plane of the paper) by a motor 13.

The motor 9 is energized by a Y-drive mechanism 14. The motor 11 is energized by an X-drive mechanism 15. The motor 13 is energized by a Z-drive mechanism 16. The drive mechanisms 14, 15 and 16 may be of the numerically controlled type. In other words, each motor is controlled by supplying to it a series of energizing electrical pulses, such that each pulse produces one increment of movement of the motor and hence one increment of movement of the workpiece or probe. The pulse frequency and the size of the increments of movement can be selected to maintain the error within any desired limits of accuracy. The supply of energizing pulses to the motors 9, 11 and 13 by drive mechanisms 14, 15 and 16, respectively, is controlled by a measuring station control element generally indicated at 17 and illustrated in greater detail in FIGS. 12 to 17, inclusive.

The measurement station 1 also includes a fixture identifier 20 which reads the tag 7 on the workpiece at the measurement station and transmits data identifying that fixture to the memory 3. Many types of suitable fixture identification systems are known in the art, for example that shown in the patent to Allen U.S. Pat. No. 3,280,659. In the Allen patent, plunger plates are shown which carry binary data, in which is encoded a program for controlling a machine tool. In using such plunger plates in the present invention, the binary data encoded thereon represents an individual identification (e.g., a serial number) for each fixture. As mentioned below, under the heading "Operation of Fabrication Station", the tag 7 may also carry data identifying a "type of workpiece", which data may be employed to select a program at the measurement station and another program at the fabrication station.

The measurement station also includes a start control 21, which may be a manual push button, or which may respond automatically to the arrival of a fixture 5 in its operating position in alignment with the probe 12, as determined by shot pins 70. A measurement station program element 22 has stored in it a number of programs hereinafter sometimes referred to as traverse data information for controlling the relative motions of the probe 12 and the fixture 5. Each of the stored programs corresponds to a particular type of workpiece on which the measurement station may be required to operate. The traverse data information may be derived from: (a) a drawing or model of the workpiece; (b) the dimensions of the measurement station 1; (c) the predetermined limits of accuracy within which the workpiece is placed on the fixture. The derivation may be made by personnel and/or by apparatus other than that disclosed herein. The particular stored program to be used is selected by a "type of workpiece" control generally indicated at 23, which may be a manually operated selector mechanism. Alternatively, "type of workpiece" information may be read from the tag 7 to select the program. After such a program is selected, it is transmitted to the measuring station control element 17, which controls the drive mechanisms 14, 15 and 16, so that the probe 12 traces certain paths having predetermined projections on the table 10 and hence on the fixture 5.

In the apparatus illustrated, the tracing of a path along the table 10 by the downward projection of the probe 12 is accomplished by holding the probe stationary and moving the table 10 in either or both of the X and Y directions. It will readily be recognized that the same effect could be accomplished by holding the table 10 stationary and moving the probe 12 in either or both of the X and Y directions. The mechanical equivalence between these two arrangements is well known in the art. In this specification wherever a relative movement between the probe 12 and the table 10 is required, it may be described in terms of movement of either the table or the probe. It should be understood that the important function is relative movement between the table 10 and the probe 12. Any statement in this specification that a particular one of these two elements is moving while the other is stationary should not be taken as a limitation of the invention.

As explained in detail below, the program carried out by the control element 17 is effective to locate accurately certain datum contours on the workpiece 6. These contours are preferably either edges of surfaces which have been previously formed on the workpiece 6, e.g., by manually controlled machine tool operations. These datum contours serve as references to determine the localities on the workpiece where further fabrication operations are to be performed automatically. As the probe 12 locates a point on a datum contour on the workpiece 6, data defining the position of the probe (and hence of a point on a datum contour) is fed back to the control element 17 and from it to a measurement station computing element 24. From the data defining at least four such points, the computing element 24 computes data defining the actual position of a workpiece on the fixture 5. This data, termed the position defining data, is different for each workpiece and hence for each fixture, and is stored by the computing element 24 in the memory 3, in association with fixture identifying data from the fixture identifier 20.

After the position defining data and the fixture identifying data have been stored in the memory 3, the fixture 5 and workpiece 6 mounted thereon are transferred by a conveyor illustrated diagrammatically at 25 to the fabrication station 2.

The fabrication station 2 includes a five axis machine tool generally indicated at 26. The machine tool 26 comprises a table 27 adapted to receive the fixture 5 in an accurately located position determined by shot pins or the like. The table 27 is rotatable about an axis 54 (FIG. 2) by a motor 35 controlled by a rotation axis drive mechanism 42. Table 27 and motor 35 are supported on another table 38 which is tiltable about an axis 39 by a motor 40 controlled by a tilt axis drive mechanism 41. Table 38 and motor 40 are in turn supported on another table 30 movable along a set of ways in the Z'' direction by means of a motor 31 controlled by a Z'' drive mechanism 32.

A tool holder 51 rotates about a horizontal axis, and is mounted on a carriage 52 (see FIG. 2) for movement in a vertical direction, hereinafter termed the Y'' direction. The tool holder 51 is moved vertically by a motor 34 controlled by a Y'' drive mechanism illustrated at 43. The tool holder carriage 52 and its motor 34 are supported on a column 53 which may be driven in the X direction by a motor 28 controlled by an X'' drive mechanism 29.

The various drive mechanisms 29, 32, 41, 42 and 43 are controlled by a fabrication station control element 44 which is in turn programmed by a fabrication station computing element 45 which receives input data from the memory 3 and also from a fabrication station program element 46. The program element 46 receives input information from a fixture identifier 47 which reads the identification data on the tags 7 and supplies it to the program element 46 to select one of many programs which may be stored in the program element. The fixture identifier 47 also supplies the same fixture identifying data to the memory 3 and calls upon it to read out the workpiece position defining data which was stored by the measurement station 1 for that particular fixture and workpiece. That data is delivered to the computing element 45, which modifies the data supplies by program element 46 and causes operation of the control element 44 in accordance with the modified data so as to produce the required contour on the workpiece 6.

The program element 22 may be any suitable memory device, such as, for example, one of the memories 102 illustrated in the patent to Terzian, U.S. Pat. No. 3,061,192. The computing element 24 may be an arithmetic unit such as that shown at 109 in the Terzian patent, together with a memory device (Terzian 102) storing instructions for solving equations (1) to (15) as set forth below. The resulting information is stored in memory 3, along with a fixture identification from identifier 20. The memory 3 may be another memory device (Terizan 102).

The program element 46 may be still another Terizan memory 102. The computing element 45 may be another arithmetic unit (Terizan 109) together with a memory device storing instructions for the solution of equations (89) to (134) below. The control element 44 may be any suitable interface between the computing element 45 and the several drives of the machine tool 26. For example, it may correspond to the output register 136 of Terizan.

It is thus possible for the fabrication station to numerically control the machine tool 26 according to program to produce whatever fabrication step is required. The machine tool program stored in the program element 46 at the fabrication station 2 may be established for a standard position of the workpiece 6 on the fixture 5. As the fixture 5 reaches the fabrication station, the workpieace 6 need not be in the standard position, but is typically in some other position which has been measured at the measurement station 1. The machine tool program of the fabrication station 2 is corrected for the difference between the standard position of the workpiece and its actual position, so that the actual fabrication steps carried out by the machine tool 26 are accurate within the desired degree of precision. The fabrication station may, of course, perform a plurality of operations on each workpiece, following a corresponding plurality of stored programs.

While it is theoretically possible for the apparatus to compensate for any finite amount of translation or of roation about any axis between the standard position of the workpiece 6 and its actual position, it is impractical and wasteful of machine time to try to make the machine compensate for gross errors in the location or orientation of the workpiece 6. It is therefore desirable to place the workpiece 6 on the fixture 5 in a position approximating that of its standard position, i.e., within a quarter of an inch, for example. The workpiece 6 may be readily placed within such limits by the operator who places the workpiece 6 on the fixture 5. The positioning of the workpiece 6 within such limits of accuracy may be easily and quickly done, and the limits of accuracy required of the operator or machine to place the workpiece on the fixture need only be in the range of one-eighth inch or one-quarter inch, whereas the desired manufacturing tolerance at the fabrication station may be on the order of 0.0001 inch.

Figure 2:
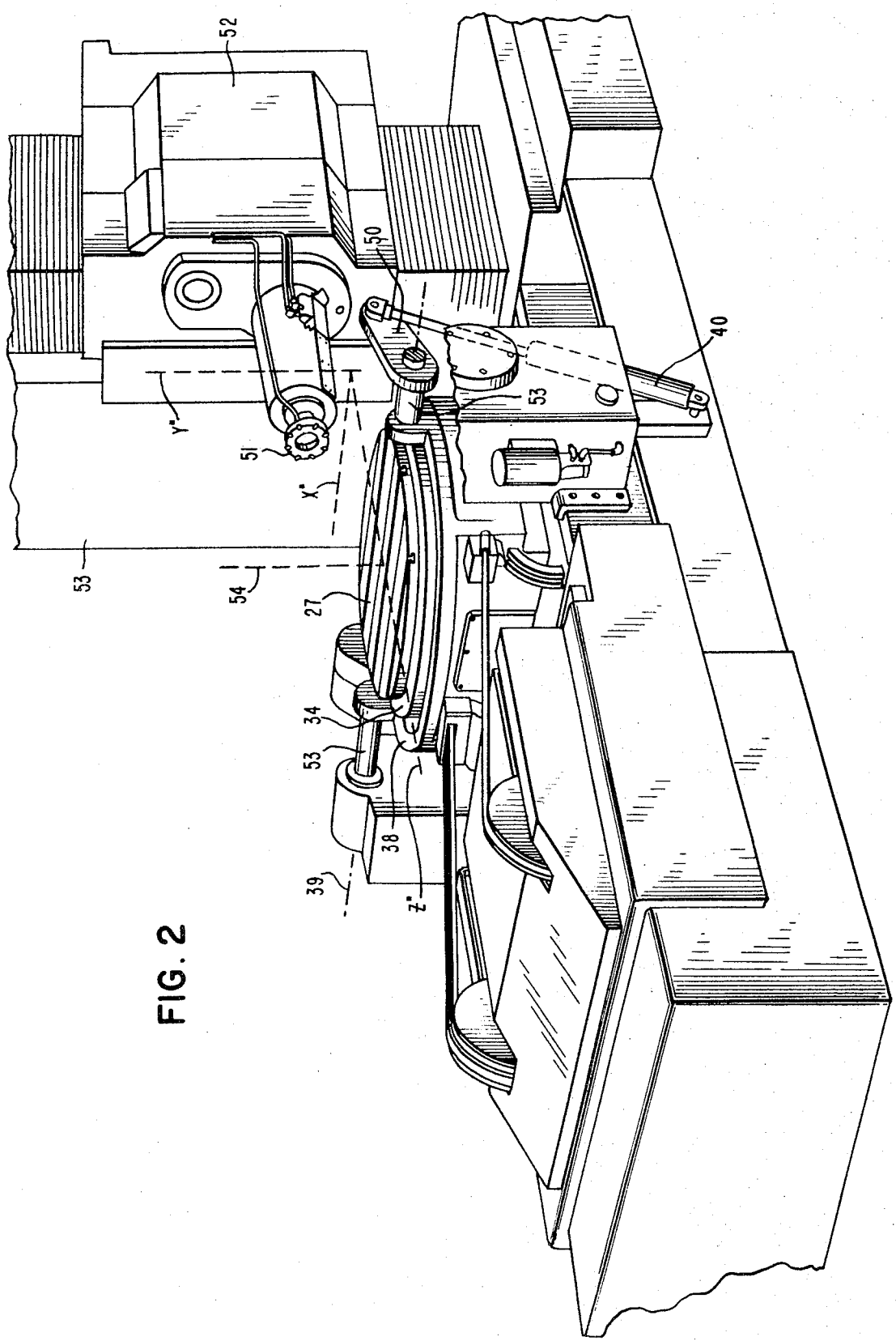
FIG. 2 is a perspective view of a typical five-axis machine tool, such as may be controlled by the apparatus of this invention.

FIG. 2 illustrates a typical five-axis milling machine which may be used at the fabrication station 2 of FIG. 1, and shows the relationship of the coordinate axes X'', Y'', Z'' to the structure of that machine.

The Y'' axis is illustrated as being vertical, and hence parallel to the direction of movement of the carriage 52 which is controlled by the Y'' drive 43 of FIG. 1.

The table 27 on which the fixture 5 is to be mounted is supported on a complex mechanism not shown in detail, which is in turn supported on a pair of stub shafts 53, pivoted for rotation about the tilt axis 39. The rotation of the shafts 53 about the tilt axis 39 is accomplished by means of a fluid motor 40 connected to a crank arm 50. The X'' and Z'' axes are both horizontal, and are perpendicular to each other and to the Y'' axis. When the tilt angle is zero, as in the position shown, the Z'' axis passes through the center of the table 27. The table 27 is rotatable about axis 54, which is vertical when the tilt angle is zero.

Thus, in the coordinate system illustrated, the X'', Y'' and Z'' axes are fixed. The tilt axis 39 may be displaced in the Z'' direction, i.e., at right angles to the Y axis. The rotation axis 54 may change its position with reference to the fixed axes as the table 27 is tilted about the axis 39 by operation of the fluid motor 40.

In referring to such a machine as a five-axis machine, the five axes are the coordinate axes X'', Y'', Z'', the tilt axis 39 and the rotation axis 54.

In the five-axis machine tool illustrated in FIG. 2, the motions about the rotation axis 54 and the tilt axis 39 are motions of the workpiece. The motions along the X'' axis and the Y'' axis are motions of the operating head of the machine tool. The motion along the Z'' axis maybe either a motion of the workpiece or of the operating head of the machine tool. This motion along the Z'' axis is commonly the tool feed motion.

The invention may alternatively be adapted to other arrangements of the five axes of the machine tool, ranging from one extreme where the workpiece is moved with respect to all five axes, while the tool head remains stationary, to the other extreme where the tool head is moved with respect to all five axes and the workpiece remains stationary.

FIGS. 3-4

These figures illustrate, somewhat diagrammatically, some of the mechanical structures involved in the operation of the probe 12 of FIG. 1. There are shown in FIG. 3, the principal operating parts of the measurement station 1, including a base 60 having a pedestal 61 projecting upwardly from one side thereof. The probe 12 is mounted on a carriage 62 which is vertically movable along the Z axis on guides formed at the end of an arm 63 at the top of the pedestal 61. The carriage 62, the guides, and the driving mechanism for the carriage may be conventional, and are not illustrated in detail. A downwardly projecting post 64 is fixed on the bottom of the carriage 62. On the under surface of the lower end of the post 64 is welded one end of a spring finger 65, which is curved substantially in a semicircle, as shown in FIG. 4. At its lower end, the spring finger 65 carries a contact point 66, of generally conical form. Bonded on the spring finger 65 is a resistance wire strain gage element 67 having appropriate wire connections 68.

The structure of the point 66 and its support limit the angular relationship with the horizontal of surfaces which can be traced by that contact point. In the particular structure illustrated, the maximum usable angular relationship is within about 45° to the horizontal. If greater angular relationships to the horizontal are required, other designs of contact point support may be employed.

The fixture 5 is fixed in position on the table 10 by means of shot pins 70 (see FIG. 3). The table 10 may be moved along the X axis, i.e., from left to right or right to left in FIG. 3, on ways 71 by means of the motor shown diagrammatically at 11 in FIG. 1. The ways 71 are in turn supported on the table 8 which may be driven in the direction of the Y axis, i.e., perpendicular to the plane of the paper in FIG. 3, by means of the motor 9, illustrated diagrammatically in FIG. 1.

FIGS. 5-9

These figures illustrate three of the five sets of coordinates which are used in carrying out the invention. The other two sets of coordinates have already been described above, namely the X, Y, Z fixture coordinates which are fixed with respect to the workpiece-supporting fixture 5, as shown in FIG. 3 and the X'', Y'', Z'' machine tool coordinates which are fixed with respect to the machine tool as shown in FIG. 2.

Figure 5:
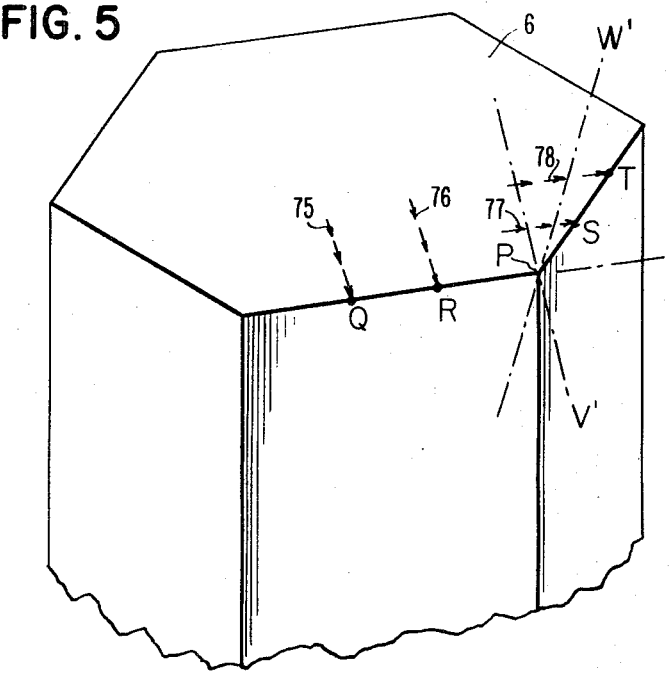
FIG. 5 is a perspective view of a workpiece illustrating four paths of movement which may be taken by the probe of FIG. 4 over the workpiece surface.
Figure 6:
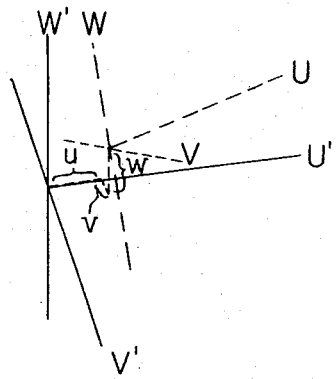
FIG. 6 is a graphical illustration of the relationship between two sets of coordinates U, V, W, and U', V', W', which are used in the analysis of the workpiece position.

FIG. 5 shows a set of coordinate identified as U', V', W', hereinafter referred to as the actual position coordinates, which are fixed with respect to the workpiece, in its actual position on the fixture. FIG. 6 shows the U', V', W' coordinates of FIG. 5 and another set of coordinates U, V, W, which are fixed with respect to a workpiece mounted on the fixture 5 in a standard position, i.e., in a standard location and with a standard orientation. Thus, the U, V, W, coordinates have a fixed relation to the X, Y, Z fixture coordinates.

Figure 7:
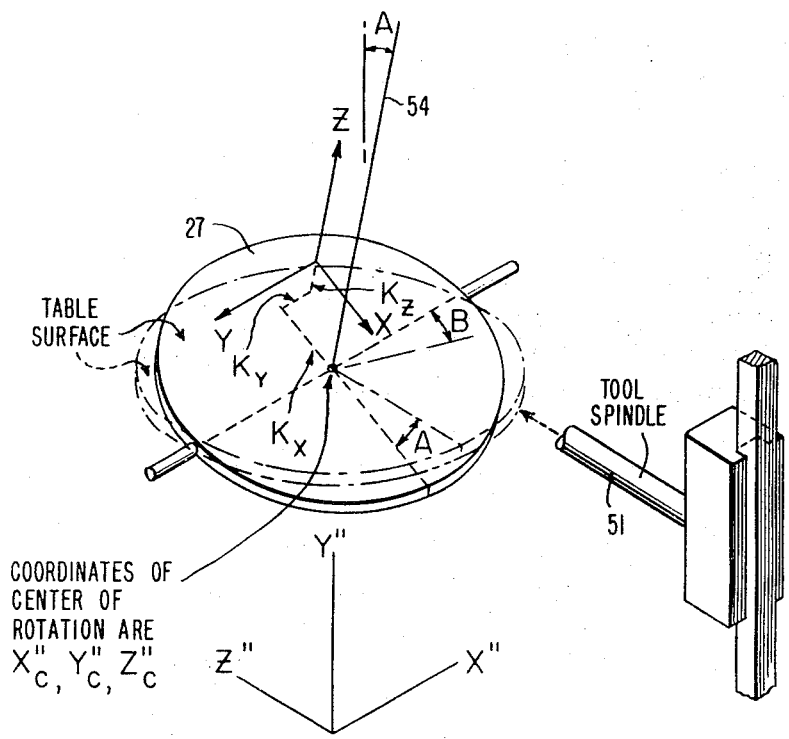
FIG. 7 is a graphical illustration of the relationship between a set of coordinates X'', Y'', Z'', fixed with reference to the machine tool of FIG. 2 and a set of coordinates X, Y, Z, fixed with respect to the fixture which supports the workpiece.

FIG. 7 shows the relationship between X'', Y'', Z'' machine tool coordinates and the X, Y, Z fixture coordinates, when the fixture is mounted on the table 27 of the machine tool.

FIGS. 8 and 9 illustrate the relationship between the X'', Y'', Z'' machine tool coordinates and a set of compensating coordinates X''', Y''', Z''', which are used in setting up the workpiece on the machine tool prior to the fabrication operation.

Referring to FIG. 5, the workpiece is shown as a vertically extending rod of hexagonal cross-section having its top surface slanted with respect to the vertical axis of the rod. Two of the edges of that top surface, namely the edge QR and the edge ST, are used as the datum contours of the workpiece. The U' axis is taken along the edge QR, and the W' axis is shown as passing through the intersection P of edges QR and ST and perpendicular to a plane defined by the lines QR and ST. The selection of these relationships simplifies the mathematics involved, but is otherwise of no significance.

If the lines QR and ST do not intersect, as in the case of lines Q''R'' and S''T'' in FIG. 11, then the W' axis is taken coincident with the mutual perpendicular $P_1 P_2$, and the U' axis passes through the point $P_0$ and is parallel to the line Q''R''.

The V' axis is then chosen perpendicular to both the U' and W' axes.

Referring to FIG. 6, the origin of the coordinates U, V, W, is shown as being offset from the origin of the coordinates U', V', W', by a distance $u$ in the U' direction, a distance $v$ in the V' direction and a distance $w$, in the W' direction. Furthermore, each of the set of coordinates, U, V, W, is rotated with respect to its counterparts U', V', W'.

The U, V, W coordinates are used to define the standard position of the workpiece, and it is intended that the workpiece be placed on the fixture in a position as close as possible to that standard position. Typically, the actual position will be linearly offset in each of the three directions from the standard position, and may also be rotated about at least one and possibly all axes, with respect to the standard position.

Referring to FIG. 7, it may be seen that the origin of fixture coordinates X, Y, Z is offset from the center of rotation of the table surface 27 by a distance $K_x$ in the X direction, a distance $K_y$ in the Y direction and a distance $K_z$ in the Z direction. When the tilt angle is zero, then the table 27 is in the dotted line position shown in FIG. 7 and the rotation axis 54 is then parallel to the Y'' axis. When the table surface has been moved to the tilted position shown in full lines in FIG. 7, the rotation axis 54 is at a tilt angle A with respect to a line parallel to the Y'' axis. The angle of rotation of the table 27 about the rotation axis 54 is shown at B, and is taken with respect to an arbitrarily selected 0° datum position. In the implementation described herein, we shall assume the angle of rotation to be 0° when the X axis is parallel to the Z'', Y'' plane and the Y axis is parallel to the Y'', X'' plane.

Referring to FIGS. 8 and 9, it may be seen from FIG. 9 that the Z' axis is parallel to the Z'' axis, and that the origin of the X', Y', Z' coordinate system is offset from the Z'', Y'' plane by the distance $E_x$, and is offset from the X'', X'' plane by the distance $E_z$. FIG. 8 shows that the origin of the X', Y', Z' coordinate system is offset from the X'', Z'' plane by the distance $E_y$, and that the X' and Y' axes are rotated, with respect to the X'' and Y'' axes by the angle C.

OPERATION OF MEASUREMENT STATION

Figure 21:
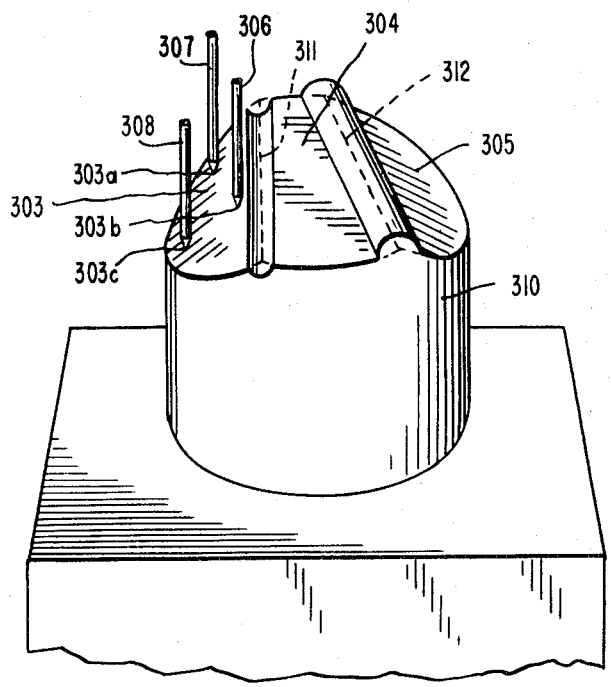
FIG. 21 is a perspective view similar to FIG. 5, but showing a different method of arranging datum contours on a workpiece.

The measurement station determines the exact position, both as to location and orientation, of each workpiece 6 relative to its supporting fixture 5. For that purpose, it is necessary that each workpiece have formed on it, before it reaches the measurement station, certain datum contours which may be used to locate all the subsequent machining operations which are performed on the workpiece. These datum contours preferably include two straight, non-parallel lines. In the preferred embodiment of the invention, which is described in detail herein, the two straight lines are physical edges QR and ST (FIG. 5) formed on the workpiece 6. In an alternative modification of the invention described below in connection with FIG. 21, the two straight lines may be the intersections of three or four planes. In that event, only portions of the planes need be formed on the workpiece and the straight line intersections may be imaginary lines located either outside the workpiece or within the workpiece.

Although each of the straight lines QR and ST is shown as being formed by the intersection of two planes, either or both of the surfaces which intersect may be curved, as long as the intersection is straight.

With the probe structure shown in FIGS. 3 and 4, it is desirable that the workpiece as it enters the measurement station have its datum contours formed to meet the following conditions:

1. a plane normal to each of the straight lines must intersect the workpiece so that the tangents to the workpiece surfaces approaching the edge form an internal angle of less than 135°;

2. when the workpiece is mounted on its holding fixture, at least one of the workpiece surfaces associated with each of the reference edges must be visible when looking down on the workpiece. Preferably, any such surface should not be inclined more than 45° with respect to the horizontal.

While the measurement station shown in FIG. 3 is a three-axis (X, Y, Z) station, an alternative form of measurement station might provide for movement about two additional axes, comparable to the rotation axis 54 and the tilt axis 39 in the machine tool of FIG. 2.

The measurement station of FIG. 3 is programmed to produce relative motion between the probe and the workpiece surface only in either the X or the Y direction. Alternative arrangements, which might be desirable for more complex workpieces, might employ more than a single probe, and might produce relative motions between the workpiece and the probes either in sequence or simultaneously, in various directions, some of which directions might be at an angle to the X and Y axes.

When a fixture 5 with a workpiece 6 secured thereto is mounted in place on the table 5 of the measurement station 1, a start signal is generated either manually or automatically by the apparatus indicated at 21 in FIG. 1. At the same time, the "type of workpiece" indicating apparatus 23 is actuated to inform the measurement station program element 22 as to the particular type of workpiece to be measured. The program element 22 stores traverse data information for many types of workpieces. After the control element 17 receives the start signal, it requests from the program element 22, the appropriate traverse data information, which is delivered to the control element 17 as described below. This traverse data information causes relative motion between the probe and the workpiece such that the probe sweeps successively along a set of four paths, such as the four paths shown at 75, 76, 77 and 78 in FIG. 5. For each of those four paths, the information defining the path consists of six fields, as follows:

X or Y: one bit
Sign: one bit
X initial: eighteen or more bits
Y initial: eighteen or more bits
X final: eighteen or more bits
Y final: eighteen or more bits Since, in the following explanation, it is assumed for purposes of simplicity that each path extends only in the X or Y direction, there is some redundancy in this information. That is to say, either the X initial and the X final values will be the same, or the Y initial and Y final values will be the same.

The operation of the control element 17 is described in detail below in connection with FIGS. 12 to 17. It is briefly outlined here in order to give a quick overall picture of the operation of the entire apparatus.

As the probe sweeps along one of the four paths along the surface of the workpiece, the motion continues until a discontinuity, i.e., an edge of the surface, is detected. The traverse motion is then stopped, and data defining the location of that point where the edge was detected is stored. Thus, after all four paths have been traversed by the probe, four points of discontinuity such as the points Q, R, S and T in FIG. 5 have been detected. The coordinates of those four points in terms of the X, Y, Z set of coordinates are therefore determined and are supplied to the computing element 24. These positions may readily be and preferably are measured to an accuracy of ± 0.0001 inch or better.

The computing element 24 makes use of known algebraic formulas to derive, from the coordinates of the four points identified in the data received from the control element 17, another set of data hereinafter termed the position defining data which describes the directions and locations of the lines QR and ST on which the four points are located.

The position defining data includes the direction cosines of the lines QR and ST, and the coordinates ($X_o$, $Y_o$, $Z_o$) of a reference point. Where the two datum contour lines intersect, as the lines QR and ST intersect at P in FIG. 5, the reference point is that point P. Where the datum contour lines do not intersect, as in the case of the lines $Q''R''$ and $S''T''$ in FIG. 11, the reference point is the midpoint $P_o$ of the mutual perpendicular $P_1 P_2$ between the lines $Q''R''$ and $S''T''$. Where the point $P_o$ on the mutual perpendicular of the two lines is used, it is also necessary to compute the direction cosines $L_o$, $M_o$, $N_o$ of the line $P_1 P_2$.

More specifically, the position defining data includes the following items:

TABLE I

| | |
|---|---|
| $L_{qr}$ | = Direction Cosine of Line QR to X-axis |
| $M_{qr}$ | = Direction Cosine of Line QR to Y-axis |
| $N_{qr}$ | = Direction Cosine of Line QR to Z-axis |
| $L_{st}$ | = Direction Cosine of Line ST to X-axis |
| $M_{st}$ | = Direction Cosine of Line ST to Y-axis |
| $N_{st}$ | = Direction Cosine of Line ST to Z-axis |
| $X_o$ | = X-coordinate of reference point |
| $Y_o$ | = Y-coordinate of reference point |
| $Z_o$ | = Z-coordinate of reference point |
| $L_o$ | = Direction Cosine of Mutual Perpendicular to X-axis |
| $M_o$ | = Direction Cosine of Mutual Perpendicular to Y-axis |
| $N_o$ | = Direction Cosine of Mutual Perpendicular to Z-axis |

The term "Direction Cosine" is explained in FIG. 10 with reference to the line QR. A line $Q'R'$ parallel to QR is constructed passing through the origin of the orthogonal coordinate system X, Y, Z. The direction cosine $L_{qr}$ is the cosine of the angle $\alpha$ between the line $Q'R'$ and the X axis. Similarly, the direction cosine $M_{qr}$ is the cosine of the angle $\beta$ between the line $Q'R'$ and the Y axis. The direction cosine $N_{qr}$ is the cosine of the angle $\gamma$ between the line $Q'R'$ and the Z axis.

The position defining data determined by the computing element 24 is stored in the memory 3 in association with data identifying a particular fixture 5. The latter data is supplied to the memory 3 by the fixture identifier 20.

OPERATION OF MEASURING STATION CONTROL ELEMENT 17 (FIGS. 12–17)

The measurement station control element 17 operates in response to a program received from the program element 22 and controls the probe actuating motor 13 and the fixture driving motors 9 and 11 so as to sweep the probe 66 relative to the workpiece along paths such as those shown at 75, 76, 77 and 78 in FIG. 5. The sequence of operations in the control element 17 is regulated by a twenty-one step ring counter, shown at 81 in FIG. 12b. The various logic circuits in the control element 17 will be described in connection with the operation of the ring counter 81 through its twenty-one steps.

Figure 17:
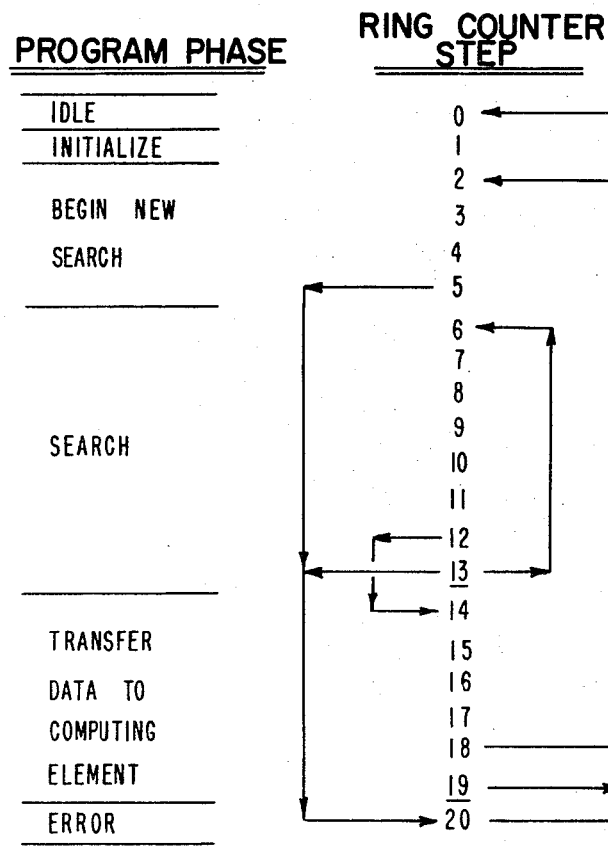
FIG. 17 is a diagram illustrating the various step sequences used in the measuring station control element.

The twenty-one steps of the counter 81 may be classified in six different program phases, shown diagrammatically in FIG. 17, and described below:

1. an idle program phase consisting only of step 0;
2. an initialize program phase consisting only of step 1;
3. a "begin new search" program phase consisting of steps 2 to 5;
4. a "search" program phase consisting of steps 6 to 13;
5. a "transfer data to computing element" program phase consisting of steps 14 to 19; and
6. an "error" program phase consisting only of step 20.

The operation of the control element 17 through the twenty-one steps of the ring counter 81 will now be described.

The clock 82 which appears in FIGS. 12A, 12B, 13A, 13B, 15A and 16 generates a continuing series of pulses at a rate consistent with the step time of the motors 9, 11 and 13. A typical clock rate might be 200 pulses per second. The ring counter 81 has twenty-one output lines labeled Step 0, Step 1 . . . Step 20. Only one of these output lines can be in the binary "1" state at a given time. All the other output lines are in the binary "0" state. The ring counter 81 starts with its output line in the "1" state, and that "1" state is stepped to the next higher numbered output line whenever a step ring pulse is applied to counter 81 through an OR gated single shot 83. The ring counter 81 can also be forced into any one of the steps numbered 0, 2, 6, 14, 20. This is done by applying signals to a ring set timing circuit 84 (FIG. 12B), which is connected through a set bus 85 to a set input of the ring counter 81.

STEP 0

Figure 12A:
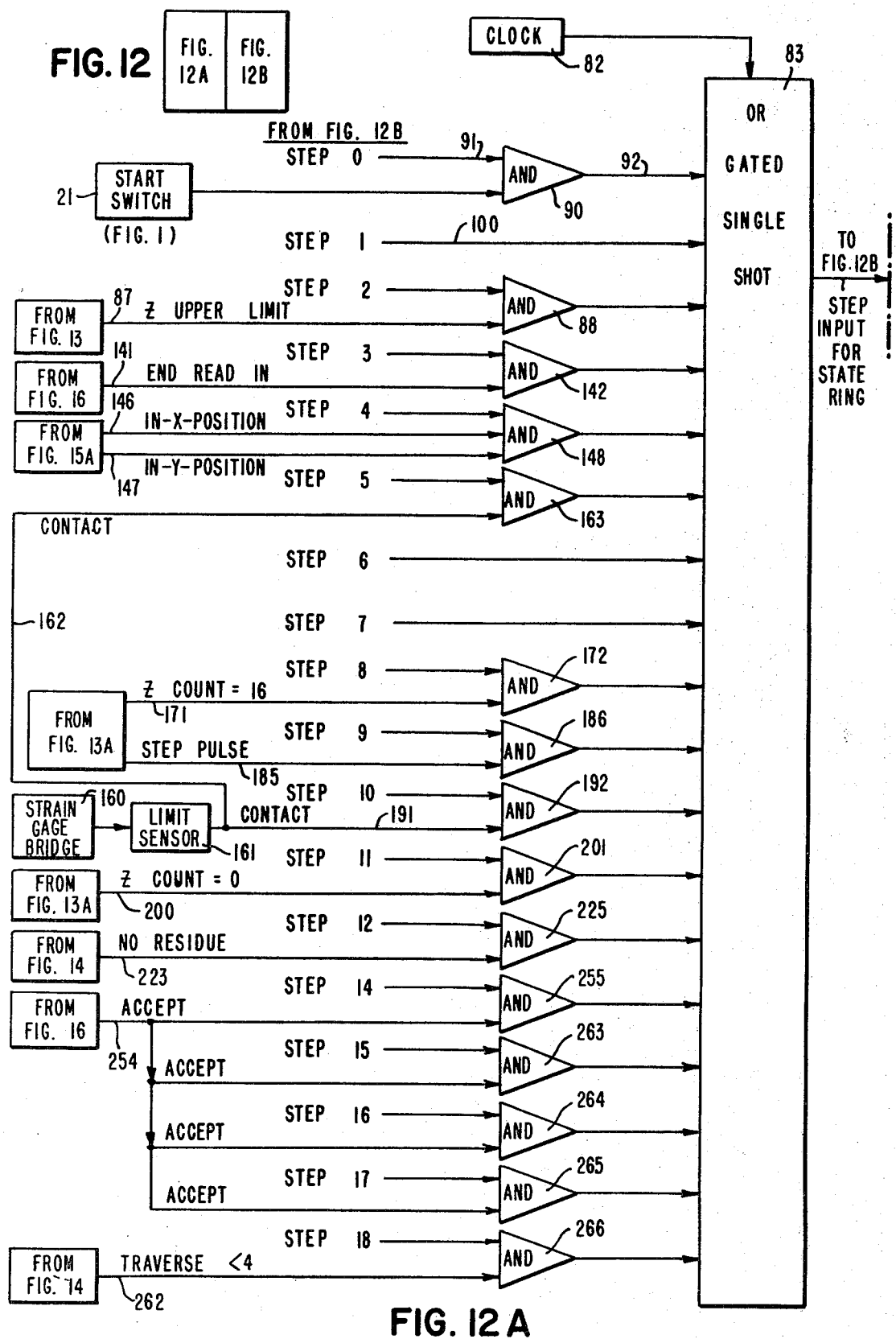

Assume that the probe 12 is at its upper limit of travel, and the Z upper limit sensor 85 (FIG. 13B) is therefore in its "1" state and is transmitting a signal through lines 86 and 87 to an AND circuit 88 in FIG. 12A. The "Normal End" indicator 89 (FIG. 12B) is energized by an output signal from ring counter 81, showing that the ring counter is in step 0.

Assume that a fixture 5 supporting a workpiece 6 now reaches the measurement station and is there fixed on the table 10 in a precise position as determined by shot pins 70 (FIG. 3). The start switch 21 is now actuated, either manually or automatically, thereby transmitting a signal to one input of an AND circuit 90 (FIG. 12A). The other input of the AND circuit 90 is at this time receiving a signal from a line 91 connected to the step 0 output of the ring counter, so that the AND circuit 90 produces an output on line 92, thereby tripping the single shot 83 to send a signal to the step ring 81, advancing it to step 1.

STEP 1

The step 1 output signal of the ring counter 81 is applied to a line 93 (FIG. 14), where it energizes the "Reset to 1" input of a traverse counter 94, which is a four-step ring counter. The traverse counter 94 determines which one of the four paths 75, 76, 77 and 78 is to be traced at any particular cycle of the counter 81. It may be assumed that in the cycle being considered, the path 75 is being traced. The step 1 output signal is also supplied through a line 100 (FIG. 12A) to an input of the single shot 83, so that the next clock pulse switches the ring counter 81 to step 2.

STEP 2

The step 2 output signal is supplied through a line 98 (FIG. 14) to the set input of a latch flip-flop 95, switching that flip-flop to its "1" state and sending an output signal on a line 96 to one input of an OR circuit 97. The flip-flop 95, when in its "1" state, insures that no output to the computing element 24 can be made, and thus prevents erroneous outputs during the initial phases of tracing a path.

The step 2 output signal is also transmitted through line 101 (FIG. 13B) to one input of an OR circuit 102 whose output is connected to one input of an AND circuit 103. The AND circuit 103 has two other inputs respectively connected to clock 82 and to the output of an inverter 104. The inverter 104 is now at its binary "0" output state, since it is receiving a signal from the Z upper limit sensor 85. Hence the AND circuit 103 produces no output in the curcumstances of the operation being immediately considered. If the probe were not at its upper limit, the AND circuit 103 would transmit a pulse along a "step Z up" line 105 with each clock pulse. These pulses are transmitted to, and accumulated in, a Z position register 109 (FIG. 15B). Each clock pulse fed through an AND circuit 111, causes a comparison of the contents of the Z position register 109 with the data on the Z position readout bus. Comparator 116 now generates "less than" signals on bus 157, which is connected to the Z drive 16, and is effective to raise the probe vertically until its upper limit is reached, whereupon the Z upper limit sensor 85 (FIG. 13B) is effective to produce a signal on line 87. This "step Z up" operation may be necessary at step 2 because (see FIG. 17) this step may at times be entered from step 19, without first going through steps 0 and 1.

Whenever the AND circuit 88 (FIG. 12A) receives an input pulse on both the step 2 ring output line and the Z upper limit line 87, it supplies a signal to the single shot 83, thereby stepping the ring counter 81 to step 3.

STEP 3

The step 3 signal is transmitted through a line 106 (FIG. 13A) to an inverter 107, which is effective to switch a line 108 to its 0 signal condition. The line 108 (see FIG. 15B) is connected to one input of AND circuit 111 having a second input connected to the clock 82. The output of AND circuit 111 is connected to the gating input of a comparator 116. Since the line 108 is now in its 0 condition, the transmission of signals through the comparator 116 to the Z drive 16 is prevented. Consequently, the Z drive motor 13 of the probe 12 does not move during step 3.

The step 3 output signal is also supplied through a line 117 (FIG. 16) to the measurement station program element 22. This signal instructs the program element to load instructions into the control element 17 in accordance with the current state of the traverse counter 94 (FIG. 14), which has an output bus 118 connected to the program element 22. The program element responds by supplying a sequence of data fields through lines 121–126 (FIG. 16), in association with a sequence of gating signals on the "data-in" bus 127 (FIG. 16).

The signal on line 121 (FIGS. 16 and 13A) cooperates with a gating signal on the data-in bus 127 to set an X or Y register 130 so as to establish a signal on either an X output line 131 or a Y output line 132 (FIG. 15A).

The data on line 122 cooperates with a gating signal on bus 127 to set a sign register 133 (FIG. 13A) so as to produce a signal selectively either on its plus output line 134 or its minus output line 135.

The signal on line 123 (FIGS. 16 and 15A) cooperates with a gating signal on the data-in bus 127 to set an X position register 136.

The data on line 124 (FIGS. 16 and 15B) cooperates with a signal on the data-in bus 127 to set a Y position register 137.

The data on line 25 (FIGS. 16 and 15A) cooperates with a gating signal on the data-in bus 127 to set an X final position register 138.

The data on line 126 (FIGS. 16 and 15B) cooperates with a gating signal on the data-in bus 127 to set Y final position register 140.

When the program element 22 has delivered the last data field on the lines 121 to 126, it changes the level of the signal on an "end read-in" output line 141 (FIGS. 16 and 12A), transmitting a signal to an AND circuit 142 whose other input line is supplied by the step 3 output line of the ring counter 81. AND circuit 142 produces an output signal effective to switch ring counter 81 to step 4.

STEP 4

When the step 3 signal stops, the inverter 107 (FIG. 13A) switches to its "1" output condition, thereby transmitting an "allow move" signal on the line 108 to AND circuit 111 (FIG. 15B), thereby permitting pulse signals from clock 82 to reach the comparator circuit 116. Since no additional data has been entered in the Z position register 109, the Z drive 16 keeps the motor 13 stationary, so that the probe 12 remains in its uppermost or "Z upper limit" position.

The step 4 output signal from ring counter 81 is supplied through a line 139 (FIG. 15A) to one input of an AND circuit 149, having a second input receiving signals from clock 82. The output signals from AND 149 are transmitted to inputs of two OR circuits 158 and 159, having respective outputs connected as gating inputs to comparators 112 and 114. Signals from the outputs of those comparators now pass to the X and Y drives 15 and 14. Consequently, relative motion between the probe and the workpiece now takes place horizontally until the probe and workpiece reach the relative positions specified by the X position and Y position registers 136 and 137.

As the motion in the X direction continues, the X position sensor 142 follows that movement, reading out the X position of the table 10 on the bus 143 to the comparator 112, where the X position is compared with the desired initial X position which has been set into the register 136. When the table 10 reaches the position determined by the X position register 136, the comparator/12 acts as a gate, stopping the supply of pulses from the clock 82 through AND 149 to the X drive 15.

In a similar fashion, the Y position sensor 144 reads out the Y position of the table 10 on the bus 145. When that position equals the setting of the Y position register 137 (FIG. 15B), the supply of pulses to the Y drive 14 stops. At this time, the table 10 is in the desired X and Y positions, and the comparators 112 and 114 are respectively effective to transmit signals on the lines 146 and 147 leading to the AND circuit 148 (FIG. 12A), which has a third input connected to the step 4 output line of the ring counter 81. The AND circuit 148 thereby sends an impulse through the single shot 83 to the ring counter 81, causing it to advance to step 5.

STEP 5

The step 5 output signal passes through line 150 (FIG. 13B) to an OR circuit 151 and thence to one input of an AND circuit 152. AND circuit 152 has a second input from the clock 82 and a third input responsive to a Z lower limit control 153, whose output is connected through a line 154 to an inverter 155. The output of inverter 155 is connected to the third input of AND circuit 152. Since the probe is not at this time at its Z lower limit, the control 153 is producing no output signal, the inverter 155 is producing an output signal, and during each clock pulse, all three of the inputs of AND circuit 152 are getting input signals. The AND circuit 152 produces an output pulse on a line 156 (FIG. 15B) which decrements the contents of Z position register 109. Register 109 has an output bus connected to comparator 116. The pulses on line 156 change the setting of the Z position register 109, thereby unbalancing the comparator 116 and allowing clock pulses from clock 82 to appear on the bus 157 leading to the Z drive 16, and causing the probe 12 to descend. Downward movement of the probe continues until either the probe reaches its lower limit or encounters a surface of workpiece 6.

In the normal operations of the apparatus, the downward movement of the probe will be stopped by contact between the probe point 66 (FIG. 3) and the workpiece 6, which contact causes the spring 65 to bend, producing a strain in the strain gage 67 and unbalancing the strain gage bridge 160 (FIG. 12A), thereby actuating its limit sensor 161 to produce a signal on the line 162 leading to one input of AND circuit 163, whose second input receives a signal from the step 5 output line of ring counter 81. AND circuit 163 thereby delivers a pulse to the single shot 83, which in turn steps the ring counter 81 to step 6.

If the probe reaches its lower limit, then the Z lower limit control 153 (FIG. 13B) is effective through the inverter 155 to close the gate at the AND circuit 152 and stop the flow of pulses to the "step Z down" line 156.

The control 153 also produces an output signal on lines 154 and 164 (see FIGS. 13B and 12B), thereby supplying an input signal to one input of an AND circuit 165, whose other input is connected to the step 5 output line of ring counter 81. AND circuit 165 thereupon delivers a signal to the ring set timing circuit 84 to switch the ring counter 81 directly to step 20, indicating that there has been an error in the operation of the apparatus.

The workpiece should be so positioned with respect to the probe 12 that the probe encounters the workpiece before it reaches the lower limit of its travel. If the probe reaches the lower limit of its travel without encountering the workpiece, then it indicates that the position of the workpiece needs to be changed. In that case, the step 20 output signal from ring counter 81 lights the error end indicator 166.

STEP 6

The step 6 signal from the ring counter 81 is applied to line 160 in FIG. 13A, which is connected to a "set to zero" input of a Z count register 161, which may, for example, be a 5-digit register, if it is assumed that the maximum Z count will be 16.

Figure 14:
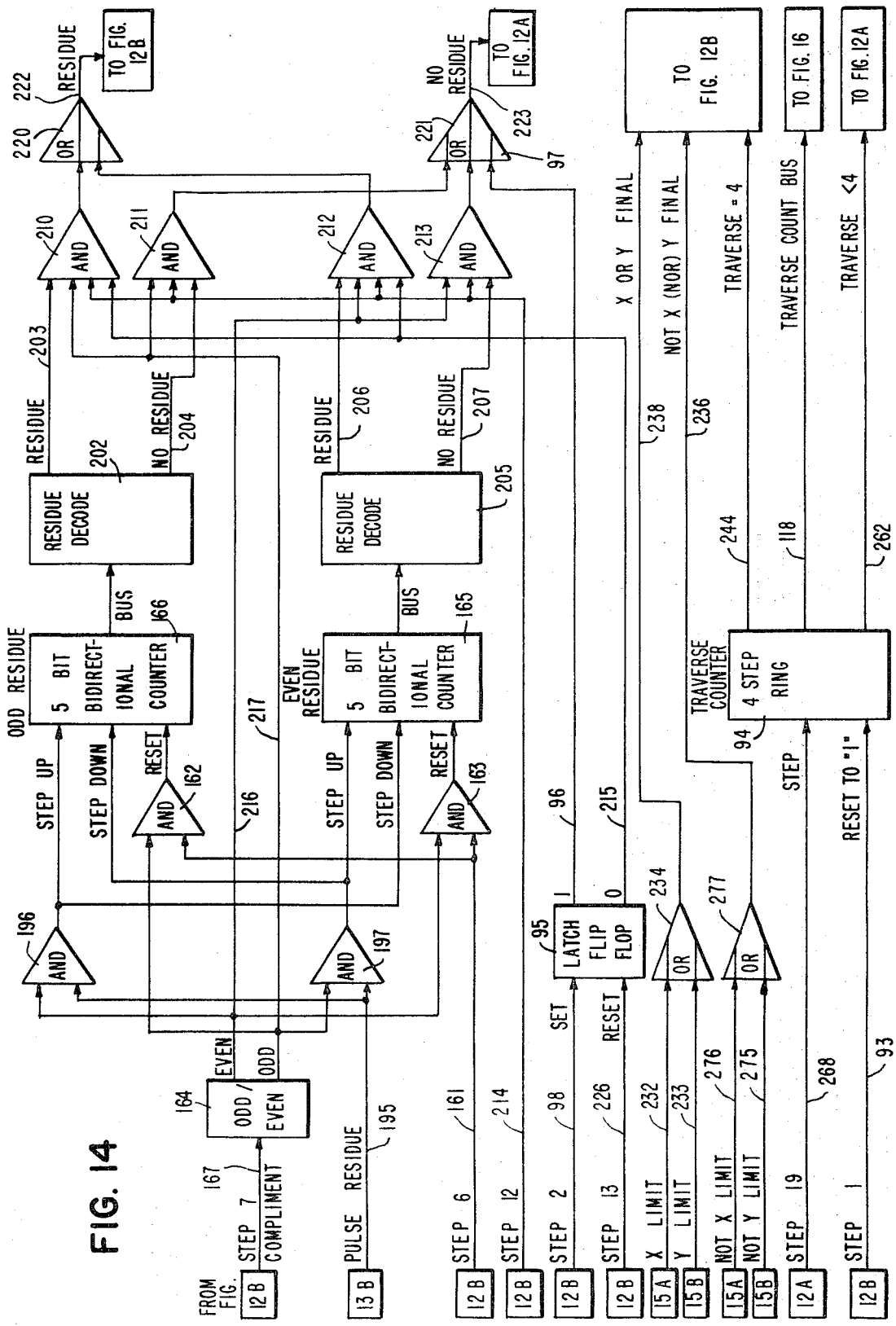
FIG. 14 illustrates in block diagram form further circuits of the measuring station control element.

The step 6 signal is also supplied to a line 161 in FIG. 14, through which it is transmitted to one input of each of two AND circuits 162 and 163. Each of the AND circuits 162 and 163 has a second input connected to one of the two outputs of an odd-even flip-flop 164. If the odd-even flip-flop 164 is producing a signal on its even-output line, then the AND circuit 163 is effective to send a reset signal to a bidirectional even residue counter 165 and to reset that counter to zero. If the odd-even register 164 is in its odd output state, then the AND circuit 162 is effective to send a reset signal to a bidirectional add residue counter 166, resetting it to its zero state.

The Z counter 161 (FIG. 13A), the even residue counter 165 and the odd residue counter 166 cooperate, in a manner described below, to detect changes in slope of the workpiece surface being traversed by the probe 12. In step 6, the Z count register 161 and only one of the two residue counters 165 and 166 are set to zero. See the detailed explanation below under the heading "SUMMARY OF CYCLE COMPRISING STEPS 6 to 13".

The leading edge of the next clock pulse steps the ring counter 81 to step 7.

STEP 7

The step 7 output signal from ring counter 81 is sent through a line 167 (FIG. 14) connected to the input of the odd-even flip-flop 164, and is effective to trip that flip-flop to its opposite state.

The leading edge of the next clock pulse steps the ring counter 81 to step 8.

STEP 8

The step 8 output signal from the ring counter 81 passes through a line 168 (FIG. 13B) and thence through OR circuit 102 and gates on the AND circuit 103. Clock pulses from clock 82 then pass through the AND circuit 103 and appear on the "Step Z up" line 105. The same pulses are fed through line 170 to the step up input of the Z counter 161. When the Z count equals 16, a signal appears on the output line 171 of counter 161, which appears in FIG. 12A as one of the inputs of an AND circuit 172. The other input of AND circuit 172 also receives the step 8 signals from ring counter 81, so that the signal on line 171 gates the AND circuit 172 on and trips the single shot 83 to set the ring counter 81 to step 9.

Thus, on step 8, the probe 12 is lifted a short distance, enough to insure clearance between the probe 12 and the workpiece 6.

STEP 9

The output signal from ring counter 81 on step 9 is supplied through a line 173 (FIG. 13A) to a single shot 174 having an output pulse which persists for more than one clock pulse and less than two clock pulses. The output of this single shot 174 is fed through a line 175 to the "set to 31" input of the Z counter 161 and sets that counter to register 31 (its maximum capacity). The step pulse from the single shot 174 is also applied to the inputs of AND circuit 176, 177, 178 and 179. One of these four AND circuits is gated on, depending on the states of the X or Y register 130 and the sign register 133, thus causing the step pulse to appear on one of the lines 180, 181, 182 or 183, leading to the position registers 136 (FIG. 15A) and 137 (FIG. 15B). Thus, either the X position register 136 or the Y position register 137 is advanced one count.

The step 9 output signal from counter 81 is also applied through a line 189 (FIG. 15A) to inputs of two AND circuits 110 and 198. AND 110 has a second input connected to clock 82 and a third input connected to X line 131. AND 198 has a second input connected to clock 82 and a third input connected to Y line 132. Depending on the condition of the X or Y register 130, one or the other of the two AND circuits 110 and 198 is gated on.

The output of AND circuit 110 passes through OR circuit 158 to the input of comparator 112. The output of AND circuit 198 passes through OR circuit 159 to the input of comparator 114.

The clock pulse thus passes through one of the AND circuits 110 and 198 and its associated OR circuit 158 or 159 and thence to the input of one of the comparators 112 and 114. That comparator is gated on and hence either the X drive 15 or the Y drive 14 is advanced one unit, causing the table 10 to move horizontally one unit in either the X or the Y direction. This stepping motion occurs after the trailing edge of the step pulse signal.

When the next clock pulse comes up, the step pulse is still on the line 185 (FIG. 12A). Consequently, AND circuit 186 in FIG. 12A is gated on and acts through the single shot 83 to step the ring counter 81 to step 10.

STEP 10

The step 10 output signal from ring counter 81 passes through a line 187 (FIG. 13B) and thence through OR circuit 151 to AND circuit 152, which is gated on, thereby transmitting clock pulses through the "step Z down" line 156 to the Z position register 109 (FIG. 15B) and also through line 188 (FIGS. 13B and 13A) to an input of OR circuit 190 and thence to the step down input of the Z counter 161. The pulses on line 156 decrement the contents of the Z position register 109, the output of which is fed to the comparator 116. Pulses on line 157 now pass to the Z drive 16, causing the probe 12 to descend. When the probe point 66 engages the surface of the workpiece, the strain gage bridge 160 (FIG. 12A) causes the limit sensor 161 to trip to its "1" state, thereby supplying a signal through line 191 to an input of AND circuit 192, gating that AND circuit on and switching the ring counter 81 to step 11.

STEP 11

The step 11 output signal from ring counter 81 is transmitted through line 193 (FIG. 13A) to AND circuit 194, where it is effective to gate clock signals from clock 82 to pass through OR circuit 190 to the step down input of the Z counter 161. The same signals pass from AND 194 through line 195 (see FIG. 14) to one input of each of two AND circuits 196 and 197. Each of these two AND circuits has one other input connected to one of the outputs of the odd-even flip-flop 164. Signals passing from the output of AND circuit 196 go to the step up input of the odd residue counter 166 and to the step down input of the even residue counter 165. Output signals from AND circuit 197 pass to the step up input of even residue counter 165 and the step down input of odd residue counter 166. Consequently, one or the other of the two residue counters 196 and 197 has transferred to it the count remaining in the Z counter 161.

When the count registered in the Z counter 161 comes to zero, that counter produces an output pulse on line 200, through which it is transmitted to one of the inputs of an AND circuit 201 (FIG. 12A). AND circuit 201 is gated on, and is effective through single shot 83 to step the ring counter 81 to the step 12.

STEP 12

The residue decoder 202 (FIG. 14) decodes the count registered on the odd residue counter 166, and generates a signal on its residue output line 203, if that count is other then 0, 1 or 31. If the counter 166 registers 0, 1, or 31, then the residue decoder 203 generates a signal on the no-residue output line 204.

The residue decoder 205 performs a similar function for the even residue counter 165, generating output signals either on its residue output line 206 or on its no-residue output line 207.

Lines 203, 204, 206 and 207 supply signals to one input each of AND circuits 210, 211, 212 and 213, respectively.

The step 12 output signal from ring counter 81 is supplied to line 214 (FIG. 14) and thence to one input of each of the four AND circuits 210, 211, 212 and 213.

The zero output line 215 of the latch flip-flop 95 is connected to one input of each of the two AND circuits 210 and 212. The even output line 216 of the odd-even flip-flop 164, is connected to one input of each of the two AND circuits 212 and 213. The odd output line 217 of the odd-even flip-flop 164 is connected to one input of each of the two AND circuits 210 and 211.

If the latch flip-flop 95 is at zero (as it will be if step 6 was preceded by step 13, i.e., if this is not the initial cycle through the search phase), and the odd-even flip-flop 164 is in the even state, then the output of the residue decoder 205 is gated through the AND circuits 212 or 213 and OR circuits 220 or 221 to either a residue output line 222 or a no-residue output line 223.

If the latch flip-flop is at zero, and the odd-even flip-flop 164 is in the odd state, then the output of residue decoder 202 is similarly gated through to the residue output line 222 or no-residue output line 223.

If a signal appears on the residue output line 222, it indicates that a discontinuity has been found on the workpiece surface, and then AND circuit 224 (FIG. 12B) is gated on to supply a signal to the ring-set timing circuit 84 to set the ring counter 81 to step 14.

If the latch flip-flop 95 is at "1" (as it will be if the cycle is a new search which passed through step 2), then a signal is produced on line 96 and through OR circuit 97 to the no-residue output line 223.

If the no-residue line 223 is on, then AND circuit 225 (FIG. 12A) is gated on and supplies a pulse to the single shot 83 which shifts the ring counter 81 to step 13.

STEP 13

The step 13 output signal from ring counter 81 is applied through a line 226 (FIG. 14) to the reset input of the latch flip-flop 95 and sets it to its zero condition, thereby producing a signal on line 215 and thence to one of the inputs of each of the AND circuits 210 and 212. This opens the gates on those AND circuits so that upon the next cycle of steps 6 to 12, a signal may be transmitted on the residue output line 222.

The step 13 output signal is also applied through a line 227 (FIG. 15B) to a gate 228 controlling the flow of data from a Z position sensor 230 to a Z buffer 231.

The step 13 output signal also passes from line 227 (FIG. 15B) to one input of an AND circuit 280 having two additional inputs, one connected through a line 281 to the clock 82 and the other connected through a line 282 to the Y output line 132 of the X/Y register 130. The step 13 output signal is also supplied on a line 273 (FIG. 15A) to one input of an AND circuit 274 having a second input connected to clock 82 and a third input connected to the X output line 131 of the X/Y register 130. Thus at step 13, one or the other of the AND circuits 280 or 274 is gated open, depending upon the condition of the X/Y register 130.

The output of AND circuit 280 feeds clock pulses to comparator 115, which delivers output pulses either on an equal output line 233, indicating that the Y dimension has reached its limiting value, or on an unequal output line 275, indicating that the Y dimension has not reached its limiting value. Similarly, the AND circuit 274, when gated open, feeds pulses through the comparator 113, and thence either to its equal output line 232, indicating that the X position register 136 has reached a limiting value equal to the setting of the X final position register 138, or an unequal output line 276, which indicates that the X position register 136 has not reached the X limit set into the final position register 138.

If an output signal appears on either of the lines 275 or 276, then it passes through an OR circuit 277 (FIG. 14), to an output line 236, leading to an AND circuit 237 (FIG. 12B) where it cooperates with the output signal from step 13 to reset the ring counter 81 to step 6 and start a new cycle of steps 6 to 13.

Thus, if the selected X or Y direction motion has not reached its final position, and no discontinuity on the workpiece surface has been found, further motion in that selected direction is required and is obtained by resetting the ring counter at step 6.

If, on the other hand, an output signal appears on either the X limit line 232 or the Y limit line 233, then that signal passes through an OR circuit 234 (FIG. 14) to a line 238 which is connected to an AND circuit 240 (FIG. 12B), which has one other input receiving the step 13 output signal from the ring circuit 81 and is effective to reset the ring circuit to the error step 20. An output signal on either of lines 232 or 233 indicates that the probe 12 has completed the traverse of one trace without finding a discontinuity on the surface. Consequently, a gross error (i.e., an error greater than the preselected limits) in the positioning of the workpiece 6 is indicated, requiring attention on the part of an operator.

SUMMARY OF EDGE-SEARCHING CYCLE COMPRISING STEPS 6—13

The probe 12 is in contact with the workpiece surface at the start of step 6. During steps 6–11, the probe is lifted a predetermined distance equal to one-half of the capacity of the Z counter 161, table 10 is moved laterally one step in the X or Y direction and the probe is then lowered until it touches the workpiece again. It remains in contact with the workpiece through step 12 and step 13 (if used).

In a normal sweep of a probe path such as path 75, the control element 17 runs repeatedly through several cycles of steps 6–13, returning after each step 13 to step 6, until the probe encounters a discontinuity. When that happens, the control element 17 goes directly from step 12 to step 14. If no discontinuity is encountered along the entire path, then the control element goes from step 13 of the last cycle to error step 20.

During successive cycles of steps 6–13, the Z counter 161 and the residue counters 165, 166 cooperate to detect discontinuities in the slope of the workpiece surface. At step 6 of each cycle, one or the other of the two residue counters is set to zero. At step 7, the odd-even register 164 is complemented. At step 8, the probe is raised by a predetermined number of steps, which are counted by counter 166, and is moved horizontally one step at step 9. At step 10, the probe is moved back toward the workpiece until it encounters the surface again. During step 11, the residue remaining in the z counter is fed into both the residue counters 165 and 166, but in opposite senses in the two counters. If the even-residue counter 165 were set to 0 at step 6, then its count will be incremented during step 11 and the count of the odd-residue counter 166 will be decremented.

During the first cycle of steps 6 to 13 of a given traverse, there will be no check for a discontinuity because of the setting of the latch flip-flop 95 to its "1" condition. On subsequent cycles of steps 6–13 during that traverse, the latch is in its 0 condition and a check for a discontinuity is made.

Assume, for example, that at the end of the first cycle of steps 6 to 13, the even-residue counter has been incremented by the residue in the Z counter determined after the downward movement of the probe. (The only alternate assumption is that the odd-residue counter has been so incremented). The ring counter 81 is then recycled to step 6, whereupon the odd-residue counter 166 is set to 0, leaving the even-residue counter with the increment count from the previous step 11.

On step 7, the odd-even register 164 is again switched, so that on the following step 11, the residue of the Z counter is fed into the two residue registers 165 and 166 in the senses opposite to those used on the previous cycle. In the example chosen for illustration, the Z counter now decrements the even-residue counter 165 and increments the odd-residue counter 166.

The count registered in the residue counter 165 at the end of step 11 of the first edge-searching cycle is a measure of the difference in elevation (i.e., the difference in the Z ordinates) between the first point of contact of the probe 12 with the workpiece surface (at step 6) and the second point of contact (at step 11). Since the horizontal movement at step 9 is a fixed distance, each reading into one of the two residue counters represents the average slope of the surface between the two points of contact at the ends of the horizontal increment of movement.

On the following edge-searching cycle, the distance representing the average slope between the second and third points of contact is subtracted in the counter 165 from the distance representing the average slope between the first and second points of contact.

If the two slopes are the same, the count in residue counter 165 is zero. This indicates no change in slope between the two intervals. If the change in slope is within a preset limit (here shown for example as $\pm 1$), no discontinuity is indicated.

If the difference between the two slopes is outside the preset limits, then the presence of a discontinuity in the last interval checked is indicated.

The vertical (Z coordinate) units of displacement may be chosen to be different from the horizontal (X and Y) units of displacement. We find it to be desirable to use a vertical unit equal to approximately 0.1 o the horizontal unit. Other ratios may be used, depending upon the accuracy required and the slope steepness expected to be encountered.

While the limits chosen to signify "no discontinuity" have been illustrated as $\pm 1$, it is obvious that the residue decoders 202 and 205 could be set to operate within any range desired, as long as it remains within the counting capacity of counters 165 and 166.

The two residue counters are employed alternately, one being used to count the residue in the Z counter after the most recent descent of the probe, while the other is comparing this residue with the residue which resulted after the penultimate descent of the probe. The terms "odd" and "even" are somewhat arbitrarily used to distinguish the two counters and to indicate their alternate operation. It is not necessary that any one counter be used on any particular descent of the probe, but only that they be used alternately.

The transfer of data into the Z buffer 231 at step 13 assures that the Z reading of the probe position at the discontinuity will be the reading of the approach side of the discontinuity, rather than on the other side. The paths to be traced are selected so that the approach side is less steep, and hence gives a more accurate Z reading than the steeper side.

STEP 14

This step directly follows step 12, when one of the residue decoders 202 and 205 indicates at step 12 that an edge or discontinuity has been encountered by the probe 12.

The step 14 output signal from ring counter 81 passes through a line 241 (FIG. 16) to the computing element 24. This signal also appears on a line 242 (FIG. 16) and is there effective to open a gate 243 so that the traverse count information from traverse counter 94 passes through a bus 244, gate 243 and and OR bus 245 to the data out bus 246 leading to the computing element 24. When the computing element 24 has recorded this information it places a signal on an accept line 247.

The signal on the accept line 247 switches an accept flip-flop 250 to its on state, thereby sending a signal through a delay line 251 to one input of an AND circuit 252. The action just described occurs at the leading edge of the accept signal from the computing element. When the accept signal subsequently returns to the zero state, an inverter 253 is switched on, and an input signal appears at the other input of AND circuit 252. Due to the effect of delay line 251, AND circuit 252 now receives input signals at both its inputs and thus produces a signal on an accept line 254.

The next clock signal passes through an AND circuit 255 having a second input connected to the accept line 254 and is effective to reset the accept flip-flop 250 to its off condition. The accept signal on line 254 also is supplied to AND circuit 255 (FIG. 12A), which is effective through the single shot 83 to step the ring counter 81 to step 15.

STEP 15

The operation on this step is similar to that on step 14, except that the data which is gated to the computing element 24 comes from the X position readout bus 143 (FIGS. 15A and 16), being gated by the step 15 output signal on a line 256, acting through a gate 248. The step 15 output signal is also supplied to an AND circuit 263, which is effective to advance the ring counter 81 to step 16.

STEP 16

This step is similar to steps 14 and 15, except that the data transmitted to the computer is from the Y position read out bus 145 (FIGS. 15A and 16) and is gated by the signal from the ring counter 81 on a line 257 (FIG. 16) acting through a gate 249. The step 16 output signal is also supplied to an AND circuit 264, which is effective to advance the ring counter 81 to step 17.

STEP 17

This step is similar to steps 14 to 16, except that the information gated to the computing element 24 comes from Z buffer 231 (FIG. 15B) through a line 260, being gated by an output signal from ring counter 81 through a line 261 (FIG. 16), acting at a gate 258. The step 17 output signal is also supplied to an AND circuit 265, which is effective to advance the ring counter to step 18.

STEP 18

The traverse counter 94 (FIG. 14) is always either producing a signal on its output line 244 indicating that the traverse count is equal to four, or it is producing a signal on its output line 262 indicating that the traverse count is less than four.

The output line 262 is connected to one input of an AND circuit 266 (FIG. 12A), which is effective to advance the ring counter 81 to step 19.

If on the other hand, a signal is appearing on output line 244, it is transmitted to one input of an AND circuit 267 (FIG. 12B) which is effective to set the ring counter back to step 0, since the signal on line 244 indicates that the probe 12 has traversed all four of the paths 75, 76, 77 and 78, and has located an edge on the workpiece on each path.

STEP 19

When the step 19 signal appears from the ring counter 81, it passes through a line 268 (FIG. 14) to the step input of the traverse counter 94, thereby advancing the traverse count by one. The same signal, marked "Step 19" in FIG. 12B is applied to the ring set timing circuit 84 to set the ring counter back to step 2.

STEP 20

The ring counter gates to step 20 only by directly advancing either from step 5 or step 13, and remains on step 20 until a reset switch 270 is actuated, thereby gating a signal through an AND circuit 271, which actuates the ring set timing circuit 84 to set the ring counter at step 0. The reset switch 270 may be manually actuated and should be actuated only after the workpiece position has been changed to correct the error which caused the counter to go to step 20. When the ring counter is on the step 20, the error end indicator 166 (FIG. 12B) is energized.

STEP 0

When the ring counter produces an output signal on its step 0 line, the normal end indicator 89 is energized. Also, the step 0 signal is applied to line 272 (FIG. 13B) and passes through the OR circuit 102 to gate the AND circuit 103 on. Clock pulses now flow through the AND circuit 103 to the "step Z up" line 105, thereby causing the probe 12 to rise until the Z upper limit sensor 85 switches to its on state. The system is now in a quiescent state and remains there until the start switch 21 (FIG. 12A) is actuated.

OPERATION OF MEASURING STATION COMPUTING ELEMENT 24

At the end of step 18, the measuring station control element 17 will have completed the tracing of all four of the paths 75, 76, 77 and 78 (FIG. 5) and hence will have transferred to the computing element 24 the coordinates of all four of the points Q, R, S and T. The coordinates of point Q are designed $X_q$, $Y_q$, $Z_q$. The coordinates of the other three points are similarly designated. The computing element 24 must now compute from those coordinates the position defining data as listed in Table I above. The direction cosines of each of the two lines QR and ST may be computed according to conventional equations. Equations (1), (2) and (3) below illustrate these equations for the direction cosines of the line QR.

$$L_{qr} = X_q - X_r / \sqrt{(X_q-X_r)^2+(Y_q-Y_r)^2+(X_q-Z_r)^2} \quad 1.$$
$$M_{qr} = Z_q - Z_r / \sqrt{(X_q-X_r)^2+(Y_q-Y_r)^2+(Z_q-Z_r)^2} \quad 2.$$
$$N_{qr} = Z_q - Z_r / \sqrt{(X_q-X_r)^2+(Y_q-Y_r)^2+(Z_q-Z_r)^2} \quad 3.$$

It may be seen that the figures on the right-hand side of each equation are derived from the coordinates of the four points which have been measured.

Each of the lines QR and ST may then be represented by a set of two simultaneous equations. Line QR may be represented by the following equations:

$$(x - X_q)/L_{qr} = (y - Y_q)/M_{qr} \quad 4.$$
$$(x - X_q)/L_{qr} = (z - Z_q)/N_{qr} \quad 5.$$

Line ST may be represented by the following equations:

$$(x - X_s)/L_{st} = (y - Y_s)/M_{st} \quad 6.$$
$$(x - X_s)/L_{st} = (z - Z_s)/N_{st} \quad 7.$$

If the two lines intersect, which will generally be known for any given workpiece, then equations (4), (5), (6) and (7) may be solved simultaneously to determine the coordinates of their intersection P.

If the two lines do not intersect, then it is necessary to determine the coordinates of the midpoint $P_o$ of the mutual perpendicular $P_1 P_2$ (FIG. 11) of the two lines QR and ST. The direction cosines for the line $P_1 P_2$ may be determined from the following equations:

$$L_o = \frac{\begin{vmatrix} M_{qr} & N_{qr} \\ M_{st} & N_{st} \end{vmatrix}}{\sqrt{\begin{vmatrix} M_{qr} & N_{qr} \\ M_{st} & N_{st} \end{vmatrix}^2 + \begin{vmatrix} N_{qr} & L_{qr} \\ N_{st} & L_{st} \end{vmatrix}^2 + \begin{vmatrix} L_{qr} & M_{qr} \\ L_{st} & M_{st} \end{vmatrix}^2}} \quad (8)$$

$$M_o = \frac{\begin{vmatrix} N_{qr} & L_{qr} \\ N_{st} & L_{st} \end{vmatrix}}{\sqrt{\begin{vmatrix} M_{qr} & N_{qr} \\ M_{st} & N_{st} \end{vmatrix}^2 + \begin{vmatrix} N_{qr} & L_{qr} \\ N_{st} & L_{st} \end{vmatrix}^2 + \begin{vmatrix} L_{qr} & M_{qr} \\ L_{st} & M_{st} \end{vmatrix}^2}} \quad (9)$$

$$N_o = \frac{\begin{vmatrix} L_{qr} & M_{qr} \\ L_{st} & M_{st} \end{vmatrix}}{\sqrt{\begin{vmatrix} M_{qr} & N_{qr} \\ M_{st} & N_{st} \end{vmatrix}^2 + \begin{vmatrix} N_{qr} & L_{qr} \\ N_{st} & L_{st} \end{vmatrix}^2 + \begin{vmatrix} L_{qr} & M_{qr} \\ L_{st} & M_{st} \end{vmatrix}^2}} \quad (10)$$

These equations are well known, and appear, for example, in the book entitled "Graphics", by A. S. Levens, published by John W. Wiley and Sons, dated 1962, page 713.

To find the coordinates of $P_o$, first substitute $X_1$ for $x$ in equations (4) and (5) above and $X_2$ for $x$ in equations (6) and (7) above. A similar set of equations may be written representing the lines $P_1 P_2$, as follows:

$$(X_2 - X_1)/L_o = (Y_2 - Y_1)/M_o \quad 11.$$
$$(X_2 - X_1)/L_o = (Z_2 - Z_1)/N_o \quad 12.$$

The equations (11) and (12) along with the equations (4), (5), (6) and (7) in which $X_1$ and $X_2$ values have been substituted, provide a set of six simultaneous equations with six unknowns, namely $X_1$, $Y_1$, $Z_1$ and $X_2$, $Y_2$, and $Z_2$, which can be solved simultaneously to determine those unknowns, which are the coordinates of the points of intersection $P_1$ and $P_2$ between the mutual perpendicular and the lines QR and ST, respectively (see FIG. 11).

Having the coordinates of $P_1$ and $P_2$, the coordinates of $P_0$ can be determined from the following conventional equations:

$X_o = \frac{1}{2} [X_1 + X_2]$  13.
$Y_o = \frac{1}{2} [Y_1 + Y_2]$  14.
$Z_o = \frac{1}{2} [Z_1 + Z_2]$  15.

The position defining data is complete as soon as these equations have been solved. The position defining data is stored in the memory 3 in the location associated with the fixture identifying data determined by the fixture identifier 20.

OPERATION OF FABRICATION STATION

When the fixture 5 carrying the workpiece 6 reaches the fabrication station 2, the fixture identifier 47 reads the fixture identifying data from the tag 7 and supplies it to the memory 3, where it commands the memory to supply the position defining data to the computing element 45. The same "type of workpiece" information from the fixture identifier 47 is supplied to the fabrication station program element 46 where it selects an appropriate fabrication program and transmits it to the computing element 45. That program as stored in the program element 46 is designed for use with a workpiece in the standard position on the fixture. The computing element 45 corrects that program for the differences between the actual position of the workpiece and the standard position so that the machine tool is operated to form the workpiece with the same accuracy and the same contour as though it were positioned in the standard position.

The data in the program element 46 is written so that for each point where the tool is to engage the workpiece, a Normal Plane (perpendicular to the tool spindle) is defined in terms of the X, Y, Z coordinates. Each Normal Plane is defined in terms of the direction cosines of a line J perpendicular to that plane, which direction cosines are identified as:

$\overline{L}_j$ = Direction Cosine of Normal Plane to X-axis
$\overline{M}_j$ = Direction Cosine of Normal Plane to Y-axis
$\overline{N}_j$ = Direction Cosine of Normal Plane to Z-axis Whenever a superscript bar ($^-$) is used in this specification, on an algebraic character, it indicates that that character refers to a workpiece in its standard position.

The program element 46 also delivers to the computing element 45 certain standard position data, as follows:

$\overline{L}_o$; $\overline{M}_o$; $\overline{N}_o$ = Direction Cosines of Mutual Perpendicular of Datum Contour Lines QR and ST
$\overline{L}_{qr}$; $\overline{M}_{qr}$; $\overline{N}_{qr}$ = Direction Cosines of Line QR
$\overline{L}_{st}$; $\overline{M}_{st}$; $\overline{N}_{st}$ = Direction Cosines of Line ST
$\overline{X}_o$; $\overline{Y}_o$; $\overline{Z}_o$ = Coordinates of Reference Point P (see FIG. 5) or $P_o$ (see FIG. 11)
$K_x$; $K_y$; $K_z$ = Offsets of Fixture Reference System with respect to Center of Rotation (see FIG. 7)
$X''_c$; $Y''_c$; $Z''_c$ = Coordinates of Center of Rotation (see FIG. 7)

The computing element 45 corrects the program data received from the program element 46 to compensate for the difference between the standard workpiece position, on which that program data is based, and the actual workpiece position, as determined by the position defining data supplied by memory 3. The corrected data is supplied to the control element 44, where it is effective to control the machine tool 26 to perform the required fabrication steps accurately on the workpiece.

The mathematics involved in the computations by the computing element is described in detail below.

The program for the machine tool must be written in terms of instructions for rotation of table 27 about the rotation axis 54, tilting table 27 about the tilt axis 39 and movement of either the workpiece or the tool spindle along the X", Y" and Z" axes. For example, a program for operating the machine tool with a workpiece mounted on the table may be written as follows:

I — Rotate table 27 about axis 53 through angle B (FIG. 7).
II — Tilt table 27 about axis 39 through angle A (FIG. 7).
III — Move table 27 in X" direction through distance $x''$.
IV — Move table 27 in Y" direction through distance $y''$.
V — Move table 27 in Z" direction through distance $z''$.
VI — Start tool drive and produce relative motion of tool and workpiece so that their point of contact moves along path $x_1''$, $y_1''$, $z_1'' - x_2''$, $y_2''$, $z_2''$.

The data stored in program element 46, also includes, for each programmed operation of the machine tool, the direction cosines of a line J defining the Normal Plane and the standard position data listed above. This data is obtainable from either: (a) a drawing or model of the workpiece as supplied to the Measurement Station 1; (b) a drawing or model of the desired finished workpiece leaving the Fabrication Station 2; and (c) the fixed dimensions of the machine tool 26. The data may be obtained either directly by measurement or by computation from measurements. The measurements and the computations required are performed either manually or by apparatus other than that disclosed herein.

The program is written, as is conventional with such machine tool programs, in terms of locations on the workpiece where the tool is intended to make contact, and also in terms of planes perpendicular to the tool axis. That is to say, for each machine operation, the workpiece and the tool will be so positioned that the tool axis is perpendicular to a particular plane defined with respect to the workpiece, and so that the tool contacts the workpiece at a particular point on that plane. Steps I and II of the program outlined above may be used to position the workpiece so that the tool axis is perpendicular to any desired plane. Steps III, IV and V of the program outlined above may then be used to align any selected point on that plane with the working surface of the tool. Step VI accomplishes the required machining operation. It is convenient to write the program initially in terms of the U, V, W axes, which are fixed with respect to a workpiece in its standard position. The program in terms of the U, V, W coordinates and the related data may be determined directly from drawings showing: (1) the contour of the workpiece as presented to the machine; and (2) the contour after machining. The writing of such a program is within the skill of the art. See for example, the patent to Kamm, U.S. Pat. No. 3,297,924. When the workpiece is oriented in the standard position with respect to the fixture, there exists a fixed relationship between the U, V, W axes and the X, Y, Z axes. There is assumed to be a standard position for mounting the fixture on the table of the fabrication machine (FIG. 2), and there is a fixed relationship (FIG. 7) between the center point of this table and the X'', Y'', Z'' axes. Consequently, there is a fixed relationship between the U, V, W and X'', Y'', Z'' coordinate systems. There is thus set up a fixed relationship between a program written in terms of the U, V, W axes and corresponding rotational displacements around the tilt axis 39 and rotational axis 54 and translational displacements with respect to the X'', Y'', Z'' orthogonal axes. Programs for converting instructions written initially in terms of the U, V, W axes into instructions which specify rotational displacements about the tilt axis 39 and the rotational axis 54, and translational displacements with respect to the orthogonal axes X'', Y'', Z'' can be prepared using techniques believed to be within the skill of the art. The mathematics involved in such a conversion is set forth below under the headings "X', Y', Z' Coordinate System" and "Program for Workpiece in Standard Position".

For the purpose of simplifying the computations associated with this invention, it is convenient if the conversion program for interpreting the instructions written in terms of the U, V, W axes is written to provide data in a somewhat different form than that described in program steps I to V as outlined above. Specifically, the translational instructions with respect to the orthogonal coordinate system will remain the same in value, but will be interpreted as referring to displacements with respect to the coordinate system U', V', W', rather than either the U, V, W or the X'', Y'', Z'' system. (See the material below under the heading "Program for Workpiece in Non-Standard Position"). Also, instead of being written to include the angles of tilt and of rotation for the fabrication machine's table, the conversion program will be written to provide the $\overline{L}_j$, $\overline{M}_j$, $\overline{N}_j$ direction cosines of the Normal Plane of the tool spindle with respect to the X, Y, Z coordinate system. (See equations (19,(20) and (21) below) A conversion program for generating the output data as described in this paragraph is believed to be within the skill of the art.

The position defining data determined at the measurement station locates the U', V', W' axes relative to the X, Y, Z axes. This data must be supplied to the fabrication station computing element 45 to correct the machine tool program so as to produce rotation of the table 27 about the axis 54, tilting of table 27 about the axis 39 and translation of the workpiece and/or the tool head along the X'', Y'', Z'' axes to shift the position of the workpiece and hence of the X, Y, Z coordinates so that the U', V', W' axes coincide with the U, V, W axes of the standard program as initially written.

The operations of rotation about axis 54 and tilting about axis 39 can make any real or imaginary plane on the workpiece normal to the tool spindle 51. However, this rotation and tilting involves a shift in the values of X'', Y'', and Z''. Consequently, the correction of the program at the machine tool is best carried out in two stages.

In the first stage, hereinafter termed the "set up stage", the rotations about the axes 39 and 54 corresponding to steps I and II of the program outlined above, are carried out to make a preselected normal plane perpendicular to the tool spindle 51.

In the second stage, hereinafter termed the "process stage", corresponding to steps III, IV, and V of the program outlined above, the tool or the workpiece may be translated in the X'', Y'' and Z'' directions to get the tool aligned with the proper point of contact.

For the convenience of analysis with respect to the required movements in the process stage, there is utilized the set of compensating coordinate axes X', Y', Z', illustrated in FIGS. 8 and 9. It can be seen that the origin of the X', Y', Z' system is located at point ($E_x$, $E_y$, $E_z$) in the X'', Y'', Z'' system. Also the Z' axis is parallel to the Z'' axis, while the X' and Y' axes are rotated with respect to the X'' and Y' axes by the angle C.

While it is entirely possible that the correction of the standard program may be accomplished with fewer sets of coordinate axes than are employed in this specification, it is considered most convenient and practical, and to make the mathematics less complex, if the method of analysis outlined herein is followed.

SET-UP STAGE

It is necessary to compute the Angle of Tilt A (FIG. 7) and the Angle of Rotation B which will so position a non-standard-oriented workpiece that its Normal Plane will be perpendicular to the Z'' axis.

For any particular type of workpeice, the direction cosines of Normal Plane of a workpiece in a standard position are supplied to the computing element 45 as a part of the fabrication program from the program element 46.

The Reference Plane is either the plane determined by the intersecting lines QR and ST, or, if those lines do not intersect, the plane through $P_0$ (FIG. 11) perpendicular to $P_1P_2$. The direction cosines of the Reference Plane are those of a line PI normal to that plane. Similarly, the direction cosines of a Normal Plane are those of a line J normal to that plane.

It is known that the cosine of the angle $\theta$, between any two lines, line 1 and line 2, is given by:

$\cos \theta_{12} = L_1L_2 + M_1M_2 + N_1N_2$ (See, for example, "Mathematical Handbook for Scientists and Engineers," by Korn and Korn, McGraw-Hill, 1st Ed., 1961, p. 57, or 2nd Ed., 1968, p. 62).

The line J may be any line perpendicular to the Normal Plane. Hence, it may be chosen to pass through the reference point P or $P_0$. If it is so chosen, then the lines QR, ST and PI (or lines parallel to those lines) will intersect J, forming with the Line J the angles $\theta_{qj}$, $\theta_{sj}$ and $\theta_{pj}$, respectively, whose respective cosines can be written as:

$\cos \theta_{qj} = \overline{L}_{qr}\,\overline{L}_j + \overline{M}_{qr}\,\overline{M}_j + \overline{N}_{qr}\,\overline{N}_j$     16.

$\cos \theta_{sj} = \overline{L}_{st}\overline{L}_j + \overline{M}_{st}\,\overline{M}_j + \overline{N}_{st}\,\overline{N}_j$     17.

$\cos \theta_{pj} = \overline{L}_p\,\overline{L}_j + \overline{M}_p\,\overline{M}_j + \overline{N}_p\,\overline{N}_j$     18.

The values of these cosines can be calculated from the data supplied to computing element 45.

Equations (16), (17) and (18) may be respectively rewritten as follows:

$$\overline{L}_j = \frac{\begin{vmatrix} \cos\theta_{qj} & \overline{M}_{qr} & \overline{N}_{qr} \\ \cos\theta_{sj} & \overline{M}_{st} & \overline{N}_{st} \\ \cos\theta_{pj} & \overline{M}_p & \overline{N}_p \end{vmatrix}}{\begin{vmatrix} \overline{L}_{qr} & \overline{M}_{qr} & \overline{N}_{qr} \\ \overline{L}_{st} & \overline{M}_{st} & \overline{N}_{st} \\ \overline{L}_p & \overline{M}_p & \overline{N}_p \end{vmatrix}} \quad (19)$$

$$\overline{M}_j = \frac{\begin{vmatrix} \overline{L}_{qr} & \cos\theta_{qj} & \overline{N}_{qr} \\ \overline{L}_{st} & \cos\theta_{sj} & \overline{N}_{st} \\ \overline{L}_p & \cos\theta_{pj} & \overline{N}_p \end{vmatrix}}{\begin{vmatrix} \overline{L}_{qr} & \overline{M}_{qr} & \overline{N}_{qr} \\ \overline{L}_{st} & \overline{M}_{st} & \overline{N}_{st} \\ \overline{L}_p & \overline{M}_p & \overline{N}_p \end{vmatrix}} \quad (20)$$

$$\overline{N}_j = \frac{\begin{vmatrix} \overline{L}_{qr} & \overline{M}_{qr} & \cos\theta_{qj} \\ \overline{L}_{st} & \overline{M}_{st} & \cos\theta_{sj} \\ \overline{L}_p & \overline{M}_p & \cos\theta_{pj} \end{vmatrix}}{\begin{vmatrix} \overline{L}_{qr} & \overline{M}_{qr} & \overline{N}_{qr} \\ \overline{L}_{st} & \overline{M}_{st} & \overline{N}_{st} \\ \overline{L}_p & \overline{M}_p & \overline{N}_p \end{vmatrix}} \quad (21)$$

In the actual position of the workpiece as determined at the measurement station:

the direction of Line QR is specified by $L_{qr}, M_{qr}, N_{qr}$;

the direction of line ST is specified by $L_{st}, M_{st}, N_{st}$; and the direction Cosines of the Reference Plane are $L_o, M_o, N_o$.

The angles $\theta_{qj}, \theta_{sj}, \theta_{pj}$ are the same as for a workpiece in the standard location, since the lines QR, ST, PI and J are all fixed with respect to the workpiece.

Having calculated $\cos\theta_{qj}$, $\cos\theta_{sj}$ and $\cos\theta_{pj}$ using equations (16) and (17) and (18), respectively, the direction cosines for the Normal Plane in its actual orientation can be calculated from the following equations, which are derived from equations (19), (20), and (21), by substituting unbarred values for L, M, N, in place of the barred values:

$$L_j = \frac{\begin{vmatrix} \cos\theta_{qj} & M_{qr} & N_{qr} \\ \cos\theta_{sj} & M_{st} & N_{st} \\ \cos\theta_{pj} & M_p & N_p \end{vmatrix}}{\begin{vmatrix} L_{qr} & M_{qr} & N_{qr} \\ L_{st} & M_{st} & N_{st} \\ L_p & M_p & N_p \end{vmatrix}} \quad (22)$$

$$M_j = \frac{\begin{vmatrix} L_{qr} & \cos\theta_{qj} & N_{qr} \\ L_{st} & \cos\theta_{sj} & N_{st} \\ L_p & \cos\theta_{pj} & N_p \end{vmatrix}}{\begin{vmatrix} L_{qr} & M_{qr} & N_{qr} \\ L_{st} & M_{st} & N_{st} \\ L_p & M_p & N_p \end{vmatrix}} \quad (23)$$

$$N_j = \frac{\begin{vmatrix} L_{qr} & M_{qr} & \cos\theta_{qj} \\ L_{st} & M_{st} & \cos\theta_{sj} \\ L_p & M_p & \cos\theta_{pj} \end{vmatrix}}{\begin{vmatrix} L_{qr} & M_{qr} & N_{qr} \\ L_{st} & M_{st} & N_{st} \\ L_p & M_p & N_p \end{vmatrix}} \quad (24)$$

J (FIG. 18) is a line perpendicular to a Normal Plane of the workpiece and passing through the origin of the X, Y, Z coordinates. Note that the line J defined here is parallel to, but not necessarily coincident with, the line J which was defined previously as passing through point P or $P_o$. Let $\phi_{jz}$ be the angle between J and the Z axis, and let $\theta_{jx}$ be the angle between the X axis and the projection of J on the X, Y plane, as shown. Then, by trigonometry, $x = J \sin\phi_{jz} \cos\theta_{jx}$  25.
$y = J \sin\phi_{jz} \sin\theta_{jx}$  26.
$z = J \cos\phi_{jz}$  27.
$L_j = x/J = \sin\phi_{jz} \cos\theta_{jx}$  28.
$M_j = y/J = \sin\phi_{jz} \sin\theta_{jx}$  29.
$N_j = z/J = \cos\phi_{jz}$  30.
$|\theta_{jx}| = \sin^{-1}(|M_j|)/(\sqrt{1-N_j^2})$  31.
$|\theta_{jx}| = \cos^{-1}(|L_j|)/(\sqrt{1-N_j^2})$  32.
$\phi_{jz} = \cos^{-1} N_j$  33.

The angle $\overline{\theta}_{jx}$ may now be computed by the following, based on equations (31) and (32) above:

$|\overline{\theta}_{jx}| = \sin^{-1}(|\overline{M}_j|)/(\sqrt{1-\overline{N}_j^2}) = \cos^{-1}(|\overline{L}_j|)/(\sqrt{1-\overline{N}_j^2})$  34.

If the signs of $\overline{M}_j$ and $\overline{L}_j$ are alike, then $\overline{\theta}_{jx}$ is positive, and if the signs of $\overline{M}_j$ and $\overline{L}_j$ are unlike, then $\overline{\theta}_{jx}$ is negative.

Similarly, angle $\overline{\phi}_{jz}$ may be computed:

$\overline{\phi}_{jz} = \cos^{-1} \overline{N}_j$  35.

The program for the five-axis machine tool 26, as stored in the program element 46, is written for processing a standard-oriented workpiece so that it will be positioned in a "set-up" mode, as follows:

1. With the table oriented so that both tilt angle A and rotation angle B are at their 0° values, the workpiece holding fixture 5 is placed on the table 27 and accurately located by means of shot pins, or equivalent mechanism.
2. Now rotate the table by the angle $B = \overline{\theta}_{jx}$, proceeding in the clockwise direction (looking down towards the $-Z$ direction) if the sign of $\overline{\theta}_{jx}$ is negative, and proceeding in the counterclockwise direction if the sign of $\overline{\theta}_{jx}$ is positive. Following the completion of this rotation, the normal line J to the Normal Plane will be positioned so as to be parallel to the Y", Z" plane.
3. Now tilt the table by the angle $A = (90° - \overline{\phi}_{jz})$. At this point, the "set-up mode" is completed, and the Normal Plane is perpendicular to Z"-axis.

If the workpiece is in a position other than the standard position on the fixture, then the procedure is the same as that described above, except that:

a. equation (31) or (32) is used instead of (34);
b. equation (33) is used instead of (35);
c. the table is rotated through angle $B = \theta_{jx}$; and
d. the table is tilted through angle $A = (90° - \phi_{jz})$.

X", Y", Z" CORRECTIONS-PROCESS STAGE

The rotation and tilting operations described above have eliminated the "pitch" and "roll" components of the misalignment introduced by the difference between the standard position of the workpiece and its actual position. It is now necessary to introduce correction movements as required along the X", Y" and Z" axes to get the workpiece into its desired position. However, the rotation and tilting operations described above have themselves introduced other displacements along the X", Y" and Z" axes. These displacements must be taken into account along with the displacements due to the differences between the standard position of the reference point P on the workpiece and its actual position.

Referring to FIG. 7, it may be seen that when both the angle of tilt A and the angle of rotation B are 0°, the coordinates of the origin of the X, Y, Z system in terms of the X", Y", Z" system are:

$(X''_c + K_y), (Y''_c + K_z), (Z''_c + K_x),$ where $X''_c$, $Y''_c$, and $Z''_c$ are the coordinates of the intersection of tilt axis 39 and rotation axis 54.

Figure 18:
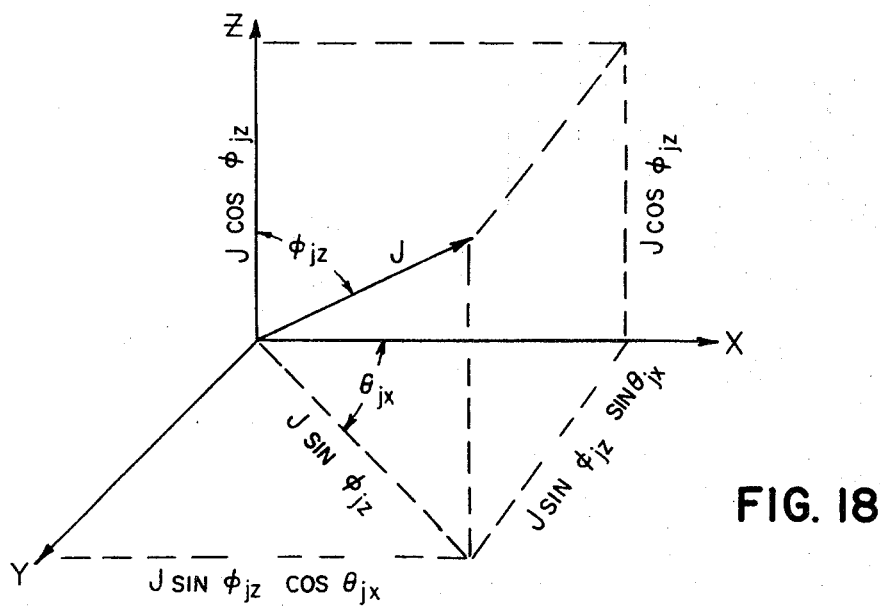
FIG. 18 is a graphical illustration showing the relationship of the rotation and tilt angles in the fabrication station and how they are related to the X, Y, Z axes.
Figure 19:
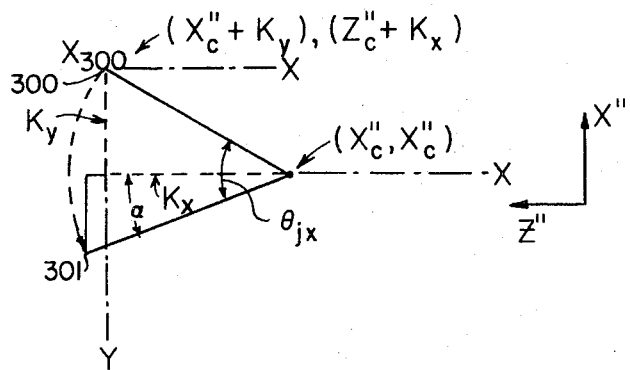
FIG. 19 illustrates how the rotation angle is related to the Y'', X'' axes at the fabrication station.

The direction cosines of the rotated and tilted X, Y, Z system with respect to the X'', Y'', Z'' system are represented herein by the following reference characters:

$s_{11}$ = cosine of the angle between the X and X'' axes $s_{21}$ = cosine of the angle between the X and Y'' axes $s_{31}$ = cosine of the angle between the X and Z'' axes $s_{12}$ = cosine of the angle between the Y and X'' axes $s_{22}$ = cosine of the angle between the Y and Y'' axes $s_{32}$ = cosine of the angle between the Y and Z'' axes
$s_{13}$ = cosine of the angle between the Z and X'' axes
$s_{23}$ = cosine of the angle between the Z and Y'' axes
$s_{33}$ = cosine of the angle between the Z and Z'' axes When the angles A and B are both 0°, the direction cosines of the X axis with respect to the X'', Y'', Z'' axes are:
$s_{11} = 0$;
$s_{21} = 0$;
$s_{31} = -1$ The corresponding direction cosine values for the Y axis are:
$s_{12} = -1$
$s_{22} = 0$
$s_{32} = 0$ The corresponding direction cosine values for the Z axis are:
$s_{13} = 0$
$s_{23} = 1$
$s_{33} = 0$ It is necessary to determine the effect on the above values caused by rotating the table in a counterclockwise direction through the angle $\theta_{jr}$ (FIGS. 18 and 19). FIG. 19 shows, on a plane parallel to the X'', Z'' plane, a projection of the movement of the origin of the X, Y, Z coordinate system from point 300 to point 301 during this rotation. In FIG. 19, it may be seen that:

$\alpha = \theta_{jr} - \tan^{-1} K_y/K_x = \theta_{jr} - \cos^{-1}(K_x/\sqrt{K_x^2+K_y^2})$ The new X'', Y'', Z'' coordinate values for the origin of the X, Y, Z system at point 301 are:

$X''_{301} = X''_c - \sqrt{K_x^2+K_y^2} \sin \alpha$     37.
$Y''_{301} = Y''_c + K_z$     38.
$Z''_{301} = Z''_c + \sqrt{K_x^2+K_y^2} \cos \alpha$     39.

During the rotation, the line joining the origin of the X, Y, Z coordinate system with the center of rotation (point $X''_c$, $Y''_c$, $Z''_c$) continues to maintain a constant angular relationship with the X and Y axes. Therefore, in the new position (point 301) of the origin of the X, Y, Z coordinate system, the values for the direction cosines of the rotated X axis with respect to the X'', Y'', Z'' axes are as follows:

$s_{11} = \sin \theta_{jr}$     40.
$s_{21} = 0$     41.
$s_{31} = -\cos \theta_{jr}$     42.

The direction cosines for the rotated Y axis are:
$s_{12} = -\cos \theta_{jr}$     43.
$s_{22} = 0$     44.
$s_{32} = -\sin \theta_{jr}$     45.

The direction cosines for the rotated Z axis are:
$s_{13} = 0$     46.
$s_{23} = 1$     47.
$s_{33} = 0$     48.

Figure 20:
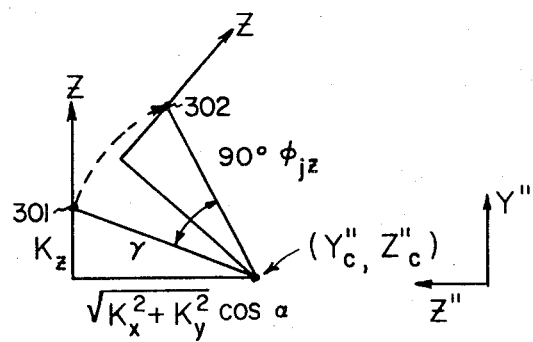
FIG. 20 is a graphical illustration showing the relationship between the tilt angle and the Y'', Z'' axes at the fabrication station.

It is further necessary to determine the effect on the above values of the tilting of the table through the angle $(90° - \phi_{jz})$ (see FIG. 20). During this tilting, the origin of the X, Y, Z system moves from point 301 to point 302.

The X'' coordinate $(x''_o)$ for the origin of the X, Y, Z system remains unchanged during this tilting, and hence is still equal to $X''_{301}$ as defined by equation (37) above. The new Y'' and Z'' coordinates for the origin of the rotated and tilted X, Y, Z system are:

$y''_o = Y''_c + \sin \Delta \sqrt{K_z^2+(K_x^2+K_y^2) \cos^2\alpha}$     49.
$z''_o = Z''_c + \cos \Delta \sqrt{K_z^2+(K_x^2+K_y^2) \cos^2\alpha}$     50.

where
$\Delta = 90° - \phi_{jz} + \sin^{-1}(K_z/\sqrt{K_z^2+(K_x^2+K_y^2) \cos^2\alpha})$ During the tilting, rotation occurs about the X'' axis so that direction cosines of the X, Y, Z axes with respect to the X'' axis remains unchanged. See equations (40), (43) and (46) above.

The various direction cosines with respect to the Y'' axis change as follows:
$s_{21} = N_j \cos \theta_{jr}$     52.
$s_{22} = N_j \sin \theta_{jr}$     53.
$s_{23} = \sqrt{1 - N_j^2}$     54.

The various direction cosines with respect to the Z'' axis change as follows:
$s_{31} = -\sqrt{1 - N_j^2}\cos \theta_{jr}$     55.
$s_{32} = -\sqrt{1 - N_j^2}\sin \theta_{jr}$     56.
$s_{33} = N_j$     57.

A set of equations similar to equations (36) to (57) may be written for a workpiece in the standard position, by simply changing the variables in those equations from the unbarred values to the barred values.

For a non-standard-oriented workpiece which has been subjected to the set-up operation, any point $(x, y, z)$ in the X, Y, Z system can be converted into a corresponding point in the X'', Y'', Z'' system by means of the following equations:     58.

$x'' = s_{11} x + s_{12} y + s_{13} z + X''_c - \sqrt{K_x^2+K_y^2} \sin\alpha$
$y'' = s_{21} x + s_{22} y + s_{23} z + Y''_c + \sqrt{K_z^2+(K_x^2+K_y^2) \cos^2\alpha} \sin \Delta$     59.
$z'' = s_{31} x + s_{32} y + s_{33} z + Z''_c + \sqrt{K_z^2+(K_x^2+K_y^2) \cos^2\alpha} \cos \Delta$     60.

For a standard-oriented workpiece which has been subjected to the set-up operation, any point $(x, y, z)$ in the X, Y, Z system can be converted into a corresponding point in the X'', Y'', Z'' system by means of equations (58) (59), (60), which are similar to (58), (59), (60), but which employ barred values:

$\bar{s}_{11}, \bar{s}_{12}, \ldots \bar{s}_{33}, \bar{\alpha}, \bar{\Delta}$

All the parameters in the above three equations can be evaluated, based on previously shown expressions.

X', Y', Z' COORDINATE SYSTEM

The "compensating coordinate system" (See FIGS. 8 and 9) is arranged such that Z' is parallel to Z'', while Y' may be rotated by the angle C with respect to Y'' and the origin of the X', Y', Z' system may be displaced with respect to that of the X'', Y'', Z'' system. The compensating coordinate system is oriented, with respect to a misaligned workpiece which has already been subjected to the "set-up stage" (i.e., has its Normal Plane perpendicular to the Z'' axis), in the same manner that the X'', Y'', Z'' system would be oriented to a standard-oriented workpiece which has been subjected to the "set-up stage".

The direction cosines of the U', V', W' axes, with respect to the X, Y, Z axes, are defined as follows:

$t'_{11}$ = cosine of angle between $X$ and $U'$
$t'_{12}$ = " " " " " $X$ and $V'$
$t'_{13}$ = " " " " " $X$ and $W'$
$t'_{21}$ = " " " " " $Y$ and $U'$
$t'_{22}$ = " " " " " $Y$ and $V'$
$t'_{23}$ = " " " " " $Y$ and $W'$
$t'_{31}$ = " " " " " $Z$ and $U'$
$t'_{32}$ = " " " " " $Z$ and $V'$
$t'_{33}$ = " " " " " $Z$ and $W'$ In the U', V', W' coordinate system, the U' coordinate is always parallel to the line QR so that its direction cosines are always those of the line QR (See equations (1), (2), and (3). Furthermore, the W' axis is always parallel either to a line perpendicular to the plane defined by the intersecting lines QR, and ST, or, where those lines do not intersect, it is parallel to the mutual perpendicular of those lines. Hence, the direction cosines of the W' axis are always equal to $L_o$, $M_o$, $N_o$ as defined by equations (8), (9) and (10) above. The direction cosines for the V' axis, may be defined in terms of the direction cosines for the U' and W' axes in accordance with the following equations:

$$t'_{12} = \frac{1}{G}\begin{vmatrix} M_{qr} & N_{qr} \\ M_o & N_o \end{vmatrix} \qquad (61)$$

$$t'_{22} = \frac{1}{G}\begin{vmatrix} N_{qr} & L_{qr} \\ N_o & L_o \end{vmatrix} \qquad (62)$$

$$t'_{32} = \frac{1}{G}\begin{vmatrix} L_{qr} & M_{qr} \\ L_o & M_o \end{vmatrix} \qquad (63)$$

where $$\left(G = \sqrt{\left(\begin{vmatrix} L_{qr} & M_{qr} \\ L_o & M_o \end{vmatrix}\right)^2 + \left(\begin{vmatrix} M_{qr} & N_{qr} \\ M_o & N_o \end{vmatrix}\right)^2 + \left(\begin{vmatrix} N_{qr} & L_{qr} \\ N_o & L_o \end{vmatrix}\right)^2}\right.$$

(64)

A similar set of direction cosines $t_{11}, t_{12}, \ldots t_{33}$ may be defined for the U, V, W axes with respect to the X, Y, Z axes.

PROGRAM FOR WORKPIECE IN STANDARD POSITION

The fabricating program for a workpiece in the standard position is most conveniently written in the first place in terms of the U, V, W coordinates, which are fixed with respect to the workpiece. After being so written, it is necessary to transform that program into terms of the X", Y", Z" coordinates, which are fixed with respect to the fabrication station.

Given the coordinates $(u, v, w)$ of a point in the U, V, W system, its coordinates with respect to the X, Y, Z system are:

$x = t_{11} u + t_{12} v + t_{13} w + \overline{x_0}$    65.
$y = t_{21} u + t_{22} v + t_{23} w + \overline{y_0}$    66.
$z = t_{31} u + t_{32} v + t_{33} w + \overline{z_0}$    67.

Where $\overline{x_0}, \overline{y_0}, \overline{z_0}$ are the coordinates in the X, Y, Z system of the origin of the U, V, W system.

Equations (58), (59) and (60) above provide the corresponding coordinates in the X", Y", Z" system for a point $(x, y, z)$ in the X, Y, Z system.

By substituting the equations (65), (66) and (67) into the equations (58) (59) and (60), we get the following equations:

$x'' = \overline{s}_{11} (t_{11} u + t_{12} v + t_{13} w + \overline{x_0}) + \overline{s}_{12} (t_{21} u + t_{22} v + t_{23} w + \overline{y_0}) + \overline{s}_{13} (t_{31} u + t_{32} v + t_{33} w + \overline{z_0}) + X''_c - \sqrt{K_x^2 + K_y^2} \sin \overline{\alpha}$   68.

$y'' = \overline{s}_{21} (t_{11} u + t_{12} v + t_{13} w + \overline{x_0}) + \overline{s}_{22} (t_{21} u + t_{22} v + t_{23} w + \overline{y_0}) + \overline{s}_{23} (t_{31} u + t_{32} v + t_{33} w + \overline{z_0}) + Y''_c + \sqrt{K_z^2 + (K_x^2 + K_y^2) \cos^2 \overline{\alpha}} \sin \overline{\alpha}$   69.

$z'' = \overline{s}_{31} (t_{11} u + t_{12} v + t_{13} w + \overline{x_0}) + \overline{s}_{32} (t_{21} u + t_{22} v + t_{23} w + \overline{y_0}) + \overline{s}_{33} (t_{31} u + t_{32} v + t_{33} w + \overline{z_0}) + Z''_c + \sqrt{K_z^2 + (K_x^2 + K_y^2)} \cos^2 \overline{\alpha} \cos \Delta$   70.

Equations (68), (69) and (70) may be rewritten to separate the $u$, $v$ and $w$ as factors, as follows:

$x'' = (\overline{s}_{11} t_{11} + \overline{s}_{12} t_{21} + \overline{s}_{13} t_{31}) u + (\overline{s}_{11} t_{12} + \overline{s}_{12} t_{22} + \overline{s}_{13} t_{32}) v + (\overline{s}_{11} t_{13} + \overline{s}_{12} t_{23} + \overline{s}_{13} t_{33}) w + \overline{s}_{11} \overline{x}_0 + \overline{s}_{12} \overline{y}_0 + \overline{s}_{13} \overline{z}_0 + X''_c - \sqrt{K_x^2 + K_y^2} \sin \overline{\alpha}$   71.

$y'' = (\overline{s}_{21} t_{11} + \overline{s}_{22} t_{21} + \overline{s}_{23} t_{31}) u + (\overline{s}_{21} t_{12} + \overline{s}_{22} t_{22} + \overline{s}_{23} t_{32}) v + (\overline{s}_{21} t_{13} + \overline{s}_{22} t_{23} + \overline{s}_{23} t_{33}) w + \overline{s}_{21} \overline{x}_0 + \overline{s}_{22} \overline{y}_0 + \overline{s}_{23} \overline{z}_0 + Y''_c + \sqrt{K_z^2 + (K_x^2 + K_y^2) \cos^2 \overline{\alpha}} \sin \Delta$   72.

$z'' = (\overline{s}_{31} t_{11} + \overline{s}_{32} t_{21} + \overline{s}_{33} t_{31}) u + (\overline{s}_{31} t_{12} + \overline{s}_{32} t_{22} + \overline{s}_{33} t_{32}) v + (\overline{s}_{31} t_{13} + \overline{s}_{32} t_{23} + \overline{s}_{33} t_{33}) w + \overline{s}_{31} \overline{x}_0 + \overline{s}_{32} \overline{y}_0 + \overline{s}_{33} \overline{z}_0 + Z''_c + \sqrt{K_z^2 + K_x^2 + K_y^2} \cos^2 \overline{\alpha} \cos \Delta$   73.

Equations (71), (72) and (73) may be rewritten in terms of the following parameters, where $\overline{a}_x, \overline{a}_y, \overline{a}_z$ represent the translation of the origin of the U, V, W system with respect to the origin of the X", Y", Z" system. The other parameters identified immediately below represent the various rotations involved in the transformation:

$\overline{a}_{11} = \overline{s}_{11} t_{11} + \overline{s}_{12} t_{21} + \overline{s}_{13} t_{31}$   74.
$\overline{a}_{12} = \overline{s}_{11} t_{12} + \overline{s}_{12} t_{22} + \overline{s}_{13} t_{32}$   75.
$\overline{a}_{13} = \overline{s}_{12} t_{13} + \overline{s}_{12} t_{23} + \overline{s}_{13} t_{33}$   76.
$\overline{a}_x = \overline{s}_{11} \overline{x}_0 + \overline{s}_{12} \overline{y}_0 + \overline{s}_{13} \overline{z}_0 + X''_c + - \sqrt{K_x^2 + K_y^2} \sin \overline{\alpha}$   77.
$\overline{a}_{21} = \overline{s}_{21} t_{11} + \overline{s}_{22} t_{21} + \overline{s}_{23} t_{31}$   78.
$\overline{a}_{22} = \overline{s}_{21} t_{12} + \overline{s}_{22} t_{22} + \overline{s}_{23} t_{32}$   79.
$\overline{a}_{23} = \overline{s}_{21} t_{13} + \overline{s}_{22} t_{23} + \overline{s}_{23} t_{33}$   80.
$\overline{a}_y = \overline{s}_{21} \overline{x}_0 + \overline{s}_{22} \overline{y}_0 + \overline{s}_{23} \overline{z}_0 + Y''_c + \sqrt{K_z^2 + (K_x^2 + K_y^2) \cos^2 \overline{\alpha}} \sin \Delta$   81.
$\overline{a}_{31} = \overline{s}_{31} t_{11} + \overline{s}_{32} t_{21} + \overline{s}_{33} t_{31}$   82.
$\overline{a}_{32} = \overline{s}_{31} t_{12} + \overline{s}_{32} t_{22} + \overline{s}_{33} t_{32}$   83.
$\overline{a}_{33} = \overline{s}_{31} t_{13} + \overline{s}_{32} t_{23} + \overline{s}_{33} t_{33}$   84.
$\overline{a}_z = \overline{s}_{31} \overline{x}_0 + \overline{s}_{32} \overline{y}_0 + \overline{s}_{33} \overline{z}_0 + Z''_c + \sqrt{K_z^2 + (K_x^2 + K_y^2)} \cos^2 \overline{\alpha} \cos \Delta$   85.

Equations (71), (72) and (73) may now be rewritten as follows:

$x'' = \overline{a}_{11} u + \overline{a}_{12} v + \overline{a}_{13} w + \overline{a}_x$   86.
$y'' = \overline{a}_{21} u + \overline{a}_{22} v + \overline{a}_{23} w + \overline{a}_y$   87.
$z'' = \overline{a}_{31} u + \overline{a}_{32} v + \overline{a}_{33} w + \overline{a}_z$   88.

The program as originally written in terms of U, V, W coordinates may be transformed into a program in terms of X", Y", Z" coordinates using equations (86), (87) and (88). This program is written and transformed by personnel and/or apparatus other than the apparatus disclosed herein. It is this program in terms of the U, V, W coordinates together with the direction cosines of the Normal Plane $\overline{L}_j, \overline{M}_j, \overline{N}_j$ that is stored in the fabrication station program element 46, and which is modified by the computing element 45 in accordance with information from the memory 3.

PROGRAM FOR WORKPIECE IN NON-STANDARD POSITION

This program may be considered as written first in terms of the U', V', W' coordinates. In the terms of those coordinates, the program is exactly the same as was written for the workpiece in the standard position in terms of the U, V, W coordinates.

Again, it is necessary to transform this program to the X'', Y'', Z'' coordinates. This transformation is carried out by the computing element 45.

The transformation from the U', V', W' coordinates may be carried out in the same fashion to that employed in the case of the U, V, W, coordinates in equations (65) to (88) above, substituting unbarred values for the barred values, and resulting in the following equations:

$$x'' = a_{11} u' + a_{12} v' + a_{13} w' + a_x \quad 89.$$
$$y'' = a_{21} u' + a_{22} v' + a_{23} w' + a_y \quad 90.$$
$$z'' = a_{31} u' + a_{32} v' + a_{33} w' + a_z \quad 91.$$

However, the workpiece after proceeding through the setup stage of operation of the fabrication station, is not oriented with respect to the X'', Y'', Z'' axes in the same manner as a workpiece in the standard position would be. Rather, its position with respect to the X', Y', Z' axes (FIGS. 8 and 9) corresponds to that of a standard position workpiece with respect to the X'', Y'', Z'' coordinates. It is therefore necessary to tranform the X'', Y'', Z'' coordinates resulting from equations (89), (90) and (91) to a set of coordinates related to the X', Y', Z' axes.

The direction cosines of the X', Y', Z' system with respect to the X'', Y'', Z'' system may be represented as follows $b_{11}$ = cosine of angle between X' and X'' axes
$b_{21}$ = '' '' '' '' X' and Y'' axes
$b_{31}$ = '' '' '' '' X' and Z'' axes
$b_{12}$ = '' '' '' '' Y' and X'' axes
$b_{22}$ = '' '' '' '' Y' and Y'' axes
$b_{32}$ = '' '' '' '' Y' and Z'' axes
$b_{13}$ = '' '' '' '' Z' and X'' axes
$b_{23}$ = '' '' '' '' Z' and Y'' axes
$b_{33}$ + '' '' '' '' Z' and Z'' axes Referring to FIGS. 8 and 9, it may be seen that the Z'' and Z' axes are parallel. Hence it follows that:

$$b_{31} = 0 \quad 92.$$
$$b_{32} = 0 \quad 93.$$
$$b_{33} = 1 \quad 94.$$
$$b_{13} = 0 \quad 95.$$
$$b_{23} = 0 \quad 96.$$
$$b_{11} = \cos C \quad 97.$$
$$b_{22} = \cos C \quad 98.$$
$$b_{21} = -\sin C \quad 99.$$
$$b_{12} = +\sin C \quad 100.$$

Angle C is the counterclockwise rotation of the Y' axis with respect to the Y'' axis, as shown in FIG. 8.

The origin of the U, V, W system is located at the point $(\bar{a}_x, \bar{a}_y, \bar{a}_z)$ in the X'', Y'', Z'' system, whose coordinates are given by equations (77), (81) and (85). The origin of the U', V', W' system is located at another point $(a_x, a_y, a_z)$ in the X'', Y'', Z'' system, whose coordinates are:

$$a_x = s_{11} x_o + s_{12} y_o + s_{13} z_o + X''_c - \sqrt{K_x^2 + K_y^2} \sin \alpha \quad 101.$$
$$a_y = s_{21} x_o + s_{22} y_o + s_{23} z_o + Y''_c + \sqrt{K_z^2 + (K_x^2 + K_y^2) \cos^2 \alpha} \sin \Delta \quad 102.$$
$$a_z = s_{31} x_o + s_{32} y_o + s_{33} z_o + Z''_c + \sqrt{K_z^2 + (K_x^2 + K_y^2) \cos^2 \alpha} \cos \Delta \quad 103.$$

Where $x_o, y_o, z_o$ are the coordinates in the X, Y, Z system of the origin of the U', V', W' system.

Since the origin of the U', V', W' system (Point $a_x, a_y, a_z$ in X'', Y'', Z'' coordinates) is displaced with respect to the origin of the X', Y', Z' system (Point $E_x, E_y, E_z$ in X'', Y'', Z'' coordinates) in the same manner that the origin of the U, V, W system Point $\bar{a}_x, \bar{a}_y, \bar{a}_z$ in X'', Y'', Z'' coordinates is displaced with respect to the origin of the X'', Y''Z'' system, it follows that:

$$E_z = a_z - \bar{a}_z \quad 104.$$

The X'', Y'', Z'' to X', Y', Z transformation equations can be written as follows:

$$x' = b_{11} (x'' - E_x) + b_{21} (y'' - E_y) + b_{31} (z'' - E_z) \quad 105.$$
$$y' = b_{12} (x'' - E_x) + b_{22} (y'' - E_y) + b_{32} (z'' - E_z) \quad 106.$$
$$z' = b_{13} (x'' - E_x) + b_{23} (y'' - E_y) + b_{33} (z'' - E_z) \quad 107.$$

The direction cosine values as set forth in equations (92) to (100) may be substituted in equations (105) to (107), so that:

$$x' = \cos C (x'' = E_x) - \sin C (y'' - E_y) \quad 108.$$
$$y' = \sin C (x'' - Ex) + \cos C (y'' - E_y) \quad 109.$$
$$z' = z'' - E_z = z'' + \bar{a}_z - a_z \quad 110.$$

To obtain the transformation of the U', V', W' system into the X', Y', Z' system, the values of the $x''$, $y''$, $z''$ from equations (89) to (91) may be substituted in equations (108) to (110), resulting in the following equations:

$$x' = \cos C (a_{11} u' + a_{12} v' + a_{13} w' + a_x - E_x) - \sin C (a_{21} u' + a_{22} v' + a_{23} w' + a_y - E_y) \quad 111.$$
$$y' = \sin C (a_{11} u' + a_{12} v' + a_{13} w' + a_x - E_x) + \cos C (a_{21} u' + a_{22} v' + a_{23} w' + a_y - E_y) \quad 112.$$
$$z' = a_{31} u' + a_{32} v' + a_{33} w' + a_z \quad 113.$$

Collecting terms and factoring gives the following:

$$x' = (a_{11} \cos C - a_{21} \sin C) u' + (a_{12} \cos C - a_{22} \sin C)v' + (a_{13} \cos C - a_{23} \sin C) w' + (a_x - E_x) \cos C - (a_y - E_y) \sin C \quad 114.$$
$$y' = (a_{11} \sin C + a_{21} \cos C) u' + (a_{12} \sin C + a_{22} \cos C)v' + (a_{13} \sin C + a_{23} \cos C) w' + (a_x - E_x) \sin C + (a_y - E_y) \cos C \quad 115.$$
$$z' = a_{31} u' + a_{32} v' + a_{33} w' + a_z \quad 116.$$

Comparing equations (114), (115) and (116) immediately above, with equations (89), (90) and (91), respectively, and bearing in mind that the relation of the U', V', W' to the X', Y' Z', coordinates is the same as the relationship of the U, V, W coordinates to the X'', Y'', Z'' coordinates, we can derive the following equations:

$$\bar{a}_{11} = a_{11} \cos C - a_{21} \sin C \quad 117.$$
$$\bar{a}_{12} = a_{12} \cos C - a_{22} \sin C \quad 118.$$
$$\bar{a}_{13} = a_{13} \cos C - a_{23} \sin C \quad 119.$$
$$\bar{a}_x = - (a_x - E_x) \cos C - (a_y - E_y) \sin C \quad 120.$$
$$\bar{a}_{21} = a_{11} \sin C + a_{21} \cos C \quad 121.$$
$$\bar{a}_{22} a = a_{12} \sin C + a_{22} \cos C \quad 122.$$
$$\bar{a}_{23} = a_{13} \sin C + a_{23} \cos C \quad 123.$$
$$\bar{a}_y = (a_x - E_x) \sin C + (a_y - E_y) \cos C \quad 124.$$
$$\bar{a}_{31} = a_{31} \quad 125.$$
$$\bar{a}_{32} = a_{32} \quad 126.$$
$$\bar{a}_{33} = a_{33} \quad 127.$$

Equations (117) and (118) may be solved simultaneously for the values of cos C and sin C, giving:

$$\cos C = (a_{11} a_{22} - a_{12} a_{21})/(a_{11} a_{22} - a_{12} a_{21}) \quad 128.$$
$$\sin C = (a_{11} a_{12} - a_{12} a_{11})/(a_{11} a_{22} - a_{12} a_{21}) \quad 129.$$

Equations (120) and (124) may be solved simultaneously for the values $E_x$ and $E_y$ giving the following:

$$E_x = a_x - a_x \cos C - a_y \sin C \quad 130.$$
$$E_y = a_x \sin C - a_y \cos C + a_y \quad 131.$$

The values of cos C, sin C, $E_x$ and $E_y$ from equations (128) to (131) may now be substituted in equations (108) to (110), giving the following conversion equations for transformations from the X', Y', Z' system to the X'', Y'', Z'' system:

$x'' = x' \cos C + y' \sin C + a_x$      132.
$y'' = x' \sin C + y' \cos C + a_y$      133.
$z'' = z' + a_z - a_z$      134.

The program in terms of the X', Y', Z' system can then be supplied to the fabrication station and will cause the machine tool apparatus at that station to produce the required contour on the workpiece.

FIG. 21

This figure illustrates a workpiece 310 having three parallel plane surfaces formed thereon, as shown at 303, 304, 305. These planes need not intersect on the surface of the workpiece. Each plane can be located by determining the positions where three separate probes 306, 307, 308 encounter its surface, as shown at 303a, 303b, 303c. Each plane so located may have its position mathematically defined from the data defining those three positions. The intersection of two planes may be computed from the data defining those planes, whether the intersection is on the workpiece surface, outside the workpiece surface as in the case of the intersection 311 of planes 303 and 304, or inside the workpiece as in the case of the intersection 312 of planes 304 and 305. The data defining the intersections 311 and 312 may be utilized to determine the position of the workpiece for subsequent programs, in a manner analogous to that in which the lines QR and ST were used in the embodiment of the invention illustrated in detail above.

After the fabrication operations on a particular workpiece have been completed, the correction data in memory 3 for that particular workpiece-supporting fixture should be erased from the memory, to make way for a new set of correction data for the next workpiece carried by that fixture.

We claim:

1. The method of detecting a plurality of discontinuities in surfaces of an object, oriented at random and determining the positional offset of the object from a predetermined position comprising the steps of:
   a. moving a probe towards a surface of an object until it engages the surface;
   b. moving the probe in the direction reverse to that used in step (a), for a predetermined distance from said object;
   c. stepping the probe at right angles to the path of movement toward and away from said object through a predetermined distance;
   d. moving the probe towards said object again until a second contact is made with said object;
   e. measuring the distance moved by the probe during step (d);
   f. repeating steps (b) through (e) a plurality of times and comparing the distances measured at each pair of successive steps (e) and calculating the general slope defined thereby;
   g. indicating a discontinuity if the the distance measured at one step (e) diverges from said slope more than a predetermined distance and storing data indicating the location of said discontinuity;
   h. repeating steps (a) through (g) again along a second path until an indication of a second discontinuity is obtained;
   i. employing means for calculating the orientation of said object relative to a predetermined set of coordinates, and the deviation of the locations of said discontinuities from predetermined positions relative to said previously recorded predetermined set of coordinates therefor,
   j. and providing an indication of the quantity of said deviation.

2. A method for measuring the slop of a surface with respect to a predetermined datum plane and detecting a discontinuity, comprising the steps of:
   a. moving a probe inwardly towards the surface in a direction at an angle to said datum plane until it contacts the surface;
   b. reversing the probe through a predetermined distance from its point of contact with the surface;
   c. stepping the probe laterally with respect to its previous path of movement through a predetermined distance;
   d. moving the probe inwardly toward the surface again until a second contact is made, said second movement being along a path substantially parallel to the first movement toward the surface in step (a);
   e. measuring the distance moved by the probe during the preceding step, and using such measurement as an indication of the average slope of the surface over the distance represented by the lateral step;
   f. repeatedly reversing the probe through a predetermined distance from its point of contact with the surface, then stepping the probe laterally along the direction in step (c) and moving the probe inwardly towards the surface again until contact is made along a path parallel to the movements in steps (a) and (d) and measuring the distance moved inwardly by the probe each time;
   g. employing calculating means adapted for determining slopes and detecting discontinuities from measured data and supplying said data thereto comprising said distances measured in (d) (a), (d), and (f) and
   h. producing from said calculating means data indicating the location of discontinuities in said surface.

3. Apparatus for measuring slopes of surfaces and a discontinuity therebetween on a workpiece, comprising:
   a. means for supporting the workpiece;
   b. 2 probe;
   c. means for supporting the probe for movement along a plurality of paths one at a time at an angle to said workpiece;
   d. program-controlled means for repeatedly moving the probe along said paths until it contacts the workpiece, reversing the probe so as to retrace its path for a predetermined distance, then moving the probe parallel to the plane through an additional predetermined distance and along an additional path moving the probe substantially parallel to its first path until it again contacts the workpiece and for shifting to another location and repeating said sequence of operations; and
   e. means for measuring the distance moved by the probe as it travels along each of said additional substantially parallel paths;
   f. calculating means for calculating slopes of planes and discontinuities between planes calculating means to receive data from said means for measuring said producing data indicating slopes and locations of discontinuities;

g. and means for registering slopes of planes and the location of a discontinuity between a plurality of planes.

4. Apparatus for detecting a discontinuity in the surface of a workpiece, comprising:
   a. a probe;
   b. means supporting the probe for movement along a first path which intersects a surface of the workpiece;
   c. program-controlled means for moving the probe along said path until it contacts the workpiece, reversing the movement of the probe so as to retrace the first path for a predetermined distance, then moving the probe at right angles to said path through a second predetermined distance and moving the probe along a second path parallel to said path until it again contacts the workpiece;
   d. means for measuring the distance moved by the probe as it travels along said second path;
   e. means for repeatedly and cyclically operating said program-controlled means and said distance measuring means;
   f. means for comparing successive measurements by said measuring means coupled to received data from said measuring means;
   g. means for calculating the slope defined by said successive measurements coupled to receive said measurements,
   h. means for computing an expected value of the address at any given location for a point on said slope coupled to said means for calculating; and
   i. means for indicating a discontinuity at a said location on the surface of the workpiece when the difference between a particular measurement by said measuring means and said expected value for said location is greater than a second predetermined distance coupled to receive said values.

5. Apparatus for measuring the slope of a surface of an object with respect to a predetermined datum plane, comprising:
   a. first means for moving a probe towards the surface in a direction at right angles to said datum plane until it contacts the surface;
   b. second means for reversing the probe through a predetermined distance from its point of contact with the surface;
   c. third means for stepping said probe laterally at right angles to its previous path of movement through a predetermined distance;
   d. fourth means for moving said probe toward the surface again until a repeated contact is made, said movement towards said repeated contact being along a path substantially parallel to the first movement toward the surface;
   e. fifth means for measuring the distance moved by said probe during operation of said fourth means;
   f. means for controlling said second, third and fourth means to perform their operations after said first means repeatedly, and
   g. calculating means for calculating slopes using such measurement by said fifth means as an indication of the average slope of the surface over the distance represented by the lateral step having an input coupled to the output of said fifth means,
   h. said discontinuity calculating means including means for determining a discontinuity at a point on data contour of said object with respect to a slope calculated by said slope calculating means by detecting a predetermined deviation of a measurement at such point from the value near such point of said average slope.

6. Apparatus in accordance with claim 3 wherein said object includes a plurality of discontinuities,
   said object including datum contours including two straight, non-parallel lines each comprising the intersection of a pair of planes of any form having a straight intersection for facilitating determination of orientation of a predetermined object, said first means for calculating employing said probe for searching for datum contours comprising coordinates of at least two points Q, R and S, T respectively for each of said datum contours,
   said calculating means being then operative for computing actual position defining data, accepting said coordinates, calculating direction cosines of said lines, testing for intersection of said datum contours and finding said position defining data and storing said actual position defining data,
   said calculating means fetching standard direction cosines and standard position data, and then computing and storing matrices and subsequently employing said matrices and fetching stored actual position defining data to determine the error trigonometrically and algebraically between said actual position data and said standard position data in three dimensions including computation of tilt, rotation, and linear displacement of said object from the position defined by said standard position data.

* * * * *